Figure 1:
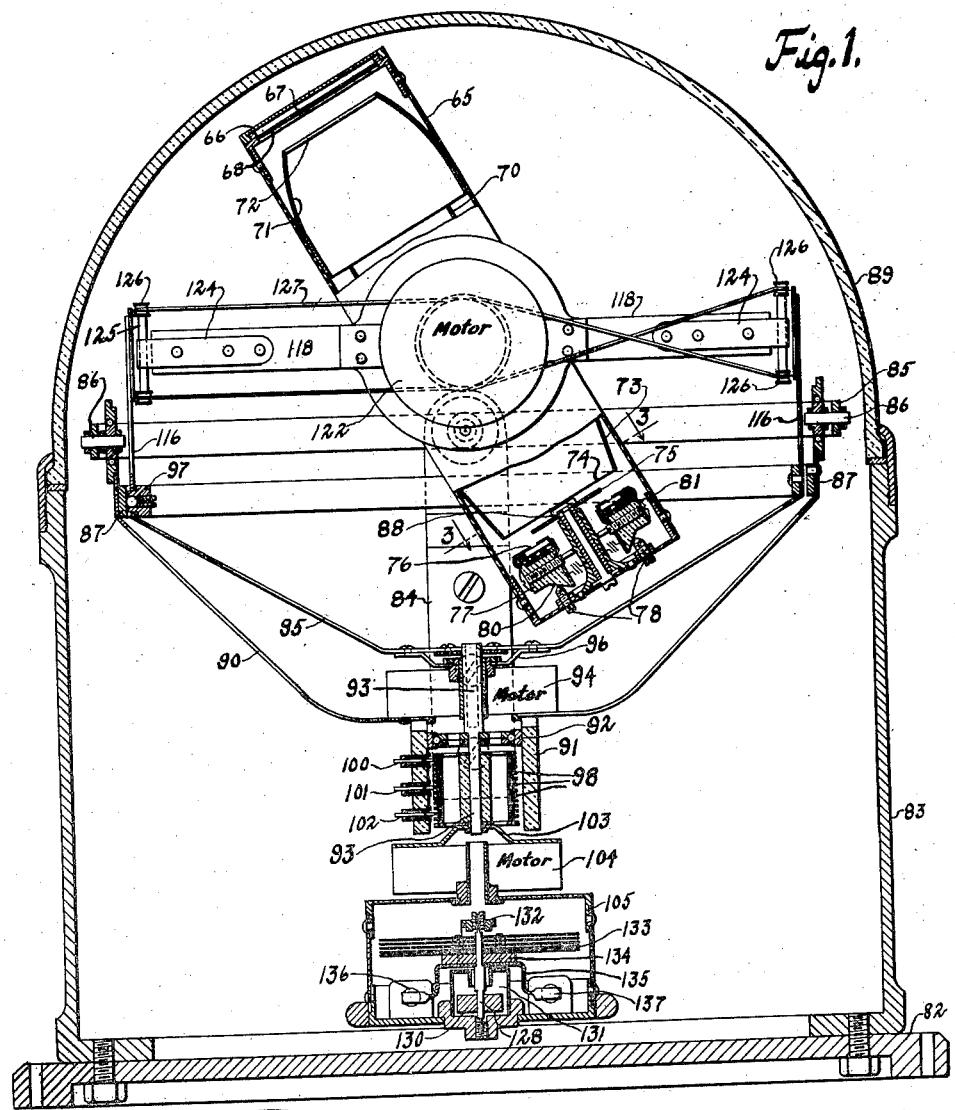

April 20, 1937.  J. C. CLARK  2,077,398
NAVIGATING INSTRUMENT
Filed Oct. 3, 1934  11 Sheets-Sheet 1

INVENTOR.
JOSEPH C. CLARK.
BY Frank H. Borden
ATTORNEY.

April 20, 1937.  J. C. CLARK  2,077,398
NAVIGATING INSTRUMENT
Filed Oct. 3, 1934  11 Sheets-Sheet 2
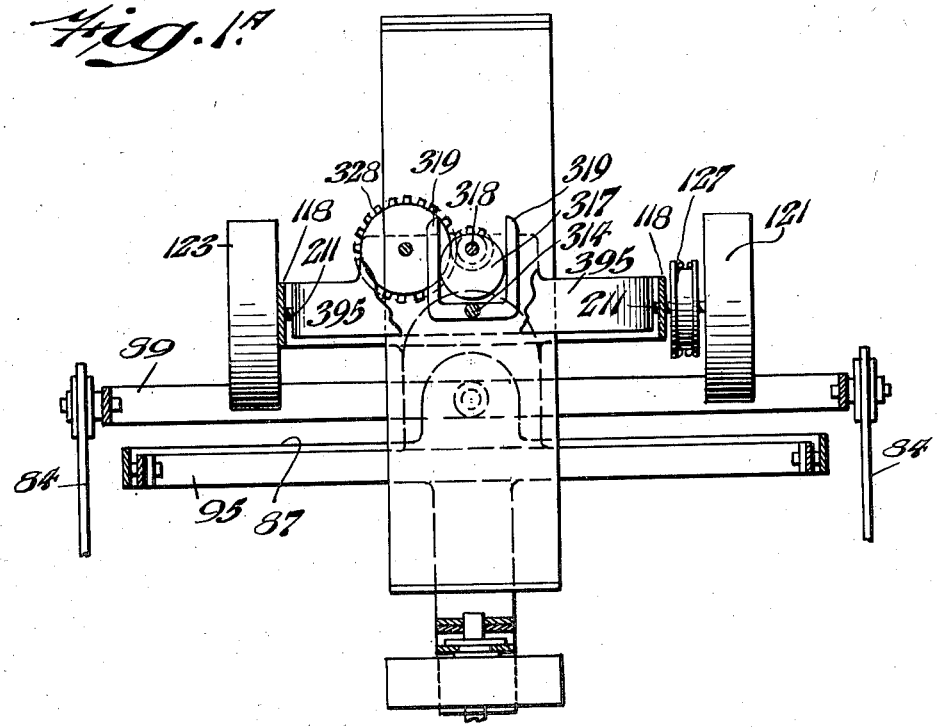
Fig. 1ᴬ
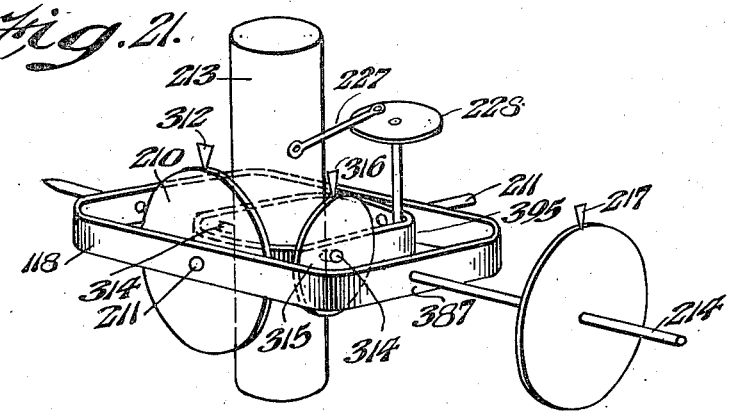
Fig. 21.
INVENTOR
JOSEPH C. CLARK.
BY
Frank H. Borden
ATTORNEY April 20, 1937.   J. C. CLARK   2,077,398
NAVIGATING INSTRUMENT
Filed Oct. 3, 1934   11 Sheets-Sheet 3

INVENTOR
JOSEPH C. CLARK.
BY
Frank H. Borden
ATTORNEY

April 20, 1937.  J. C. CLARK  2,077,398
NAVIGATING INSTRUMENT
Filed Oct. 3, 1934  11 Sheets-Sheet 4
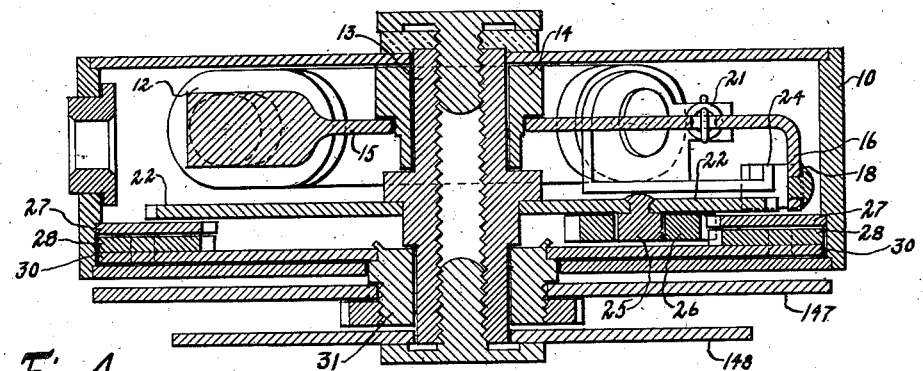
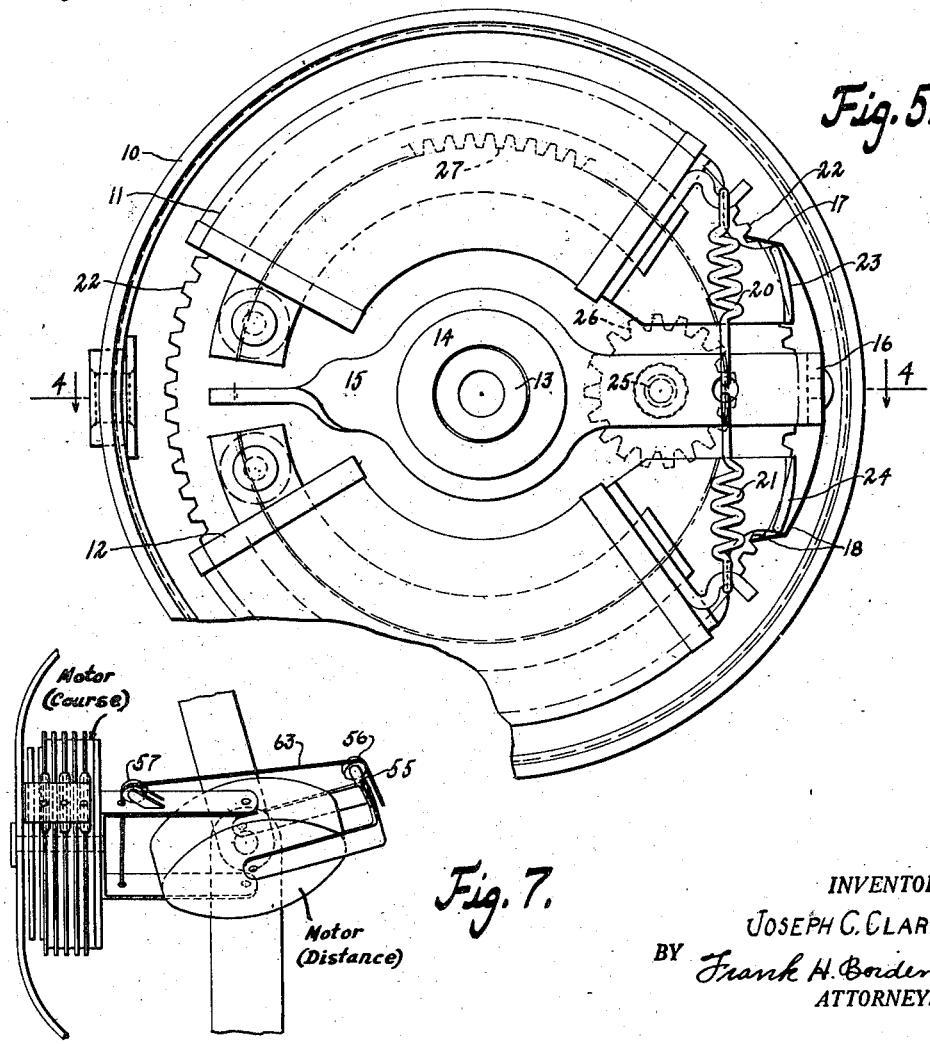
INVENTOR.
JOSEPH C. CLARK.
BY Frank H. Borden
ATTORNEY.

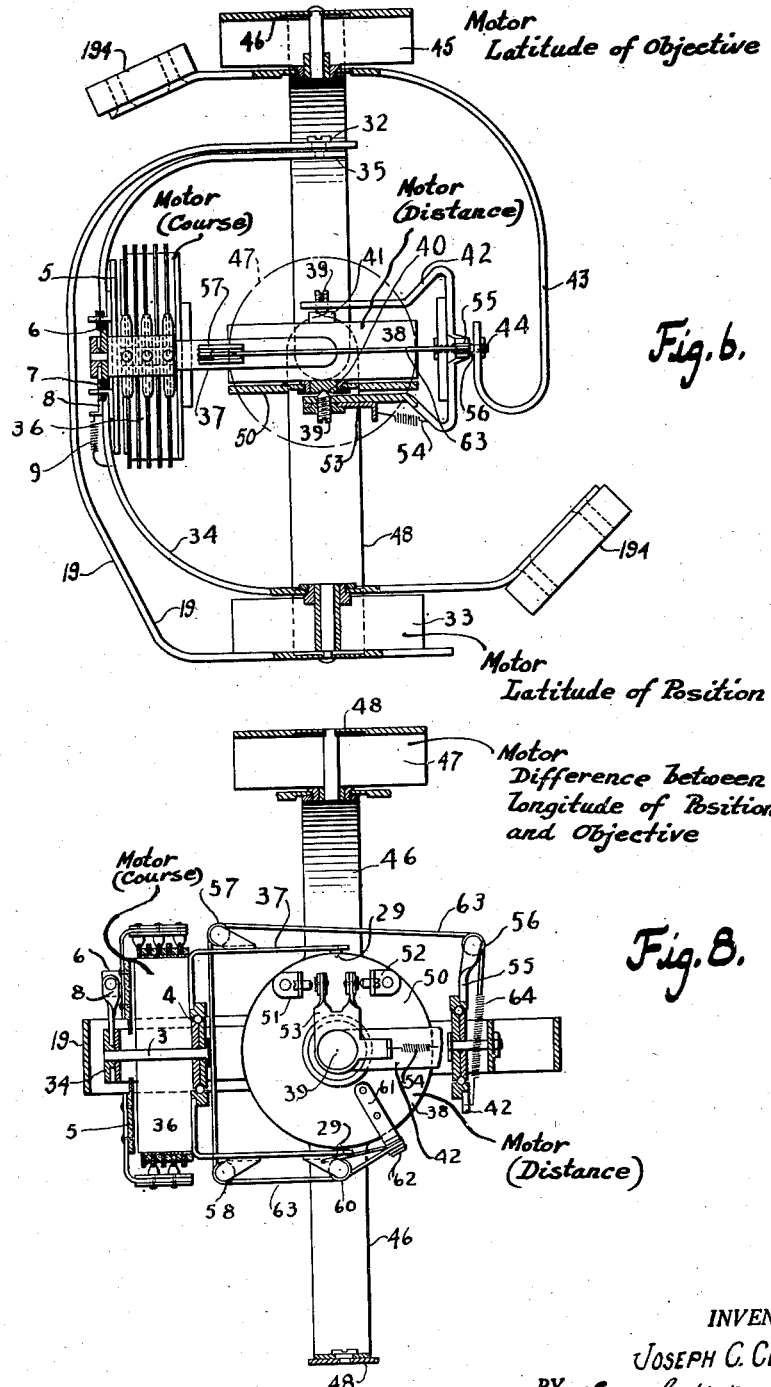

April 20, 1937.  J. C. CLARK  2,077,398
NAVIGATING INSTRUMENT
Filed Oct. 3, 1934  11 Sheets-Sheet 6
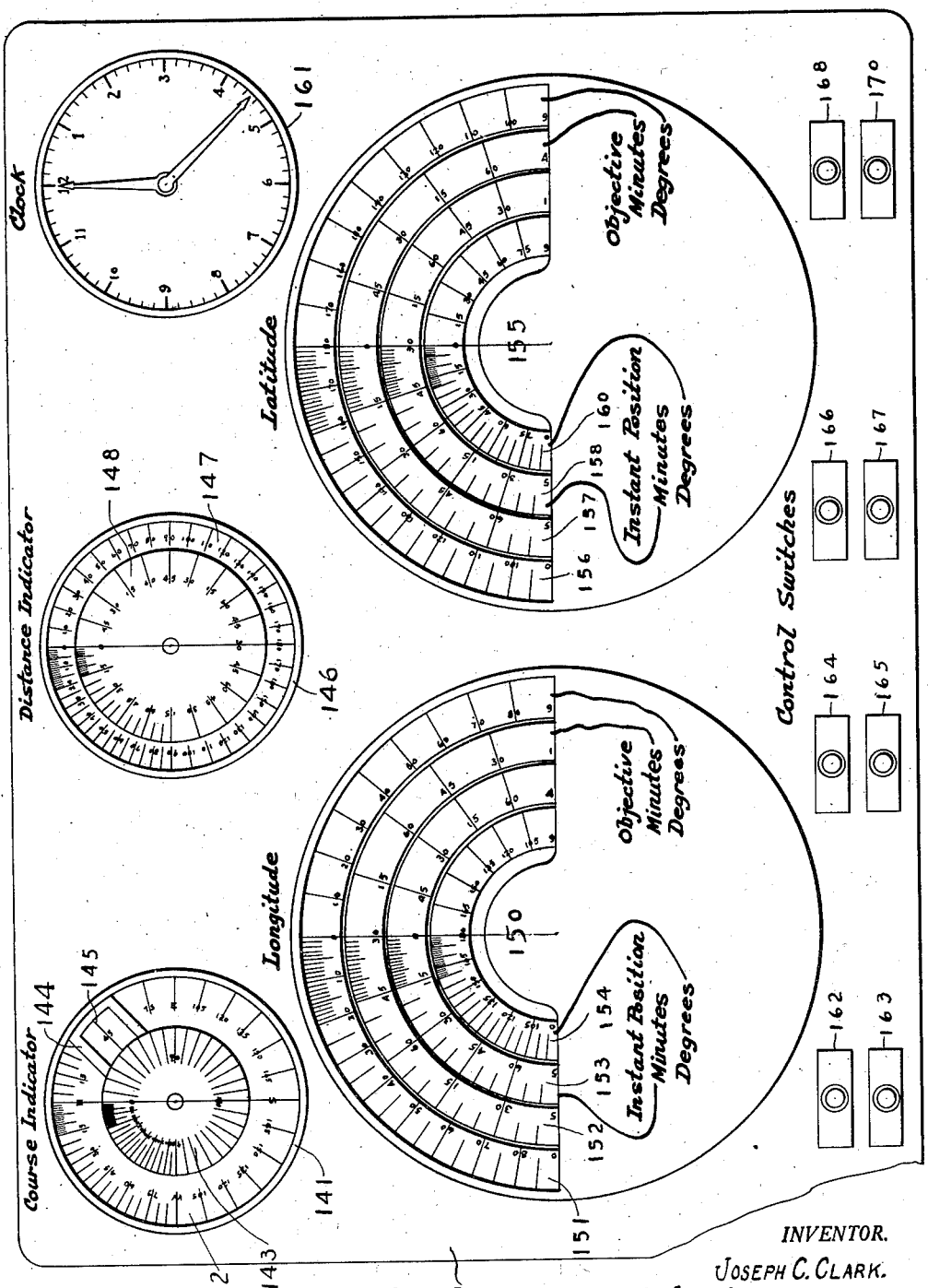
INVENTOR.
JOSEPH C. CLARK.
BY Frank H. Borden
ATTORNEY.

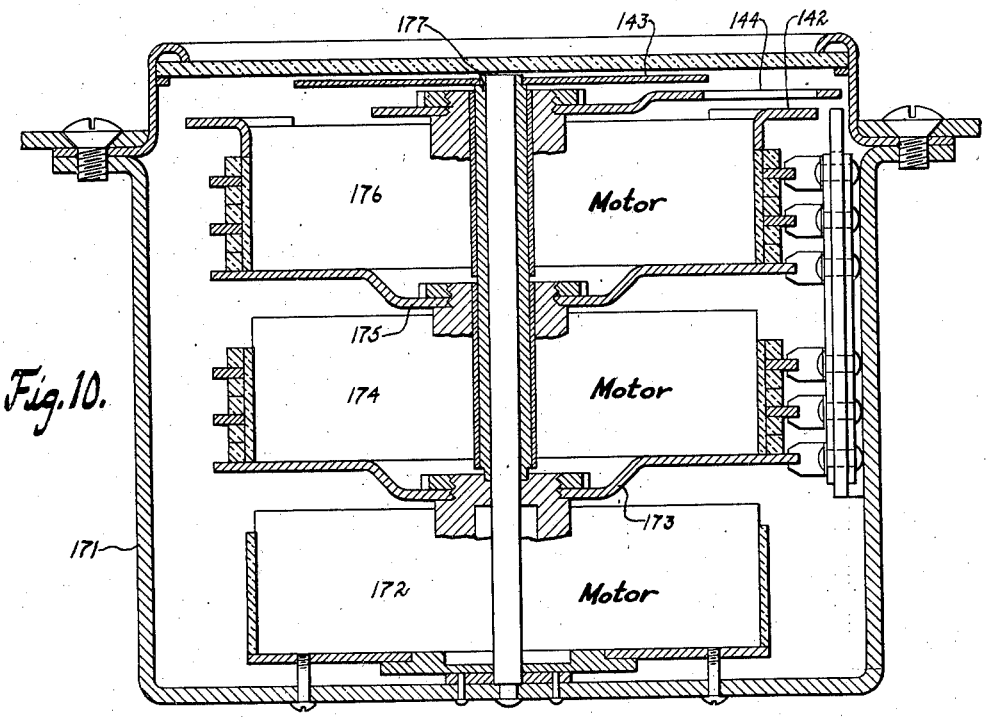
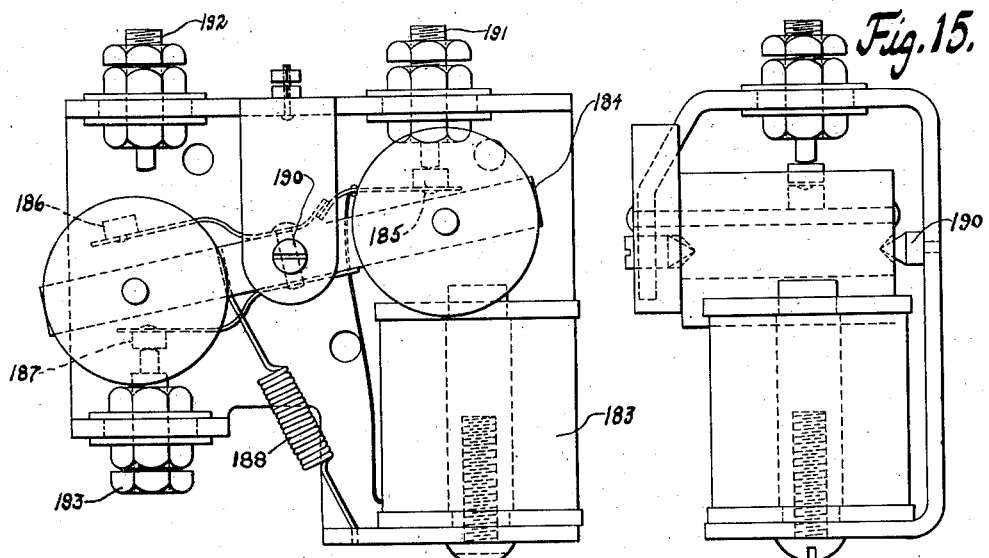
Fig. 10.
Fig. 14.   Fig. 15.
INVENTOR.
JOSEPH C. CLARK.
BY Frank H. Borden
ATTORNEY.

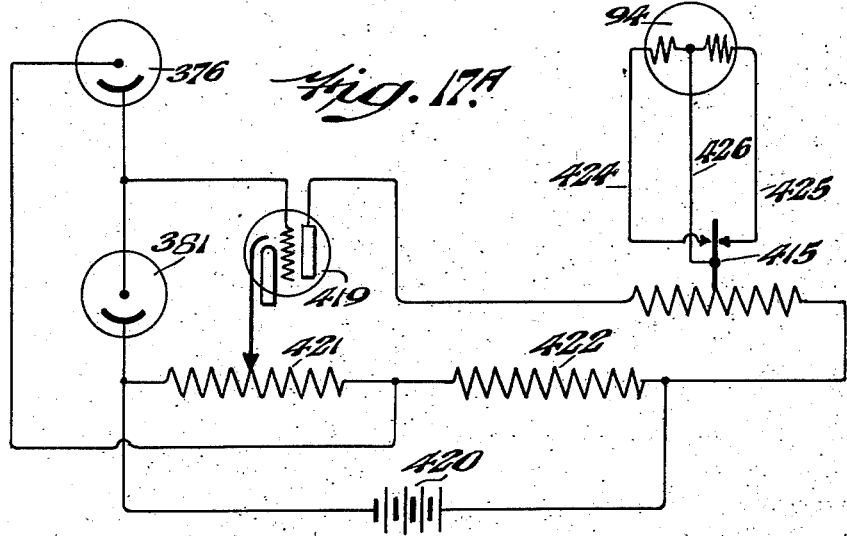
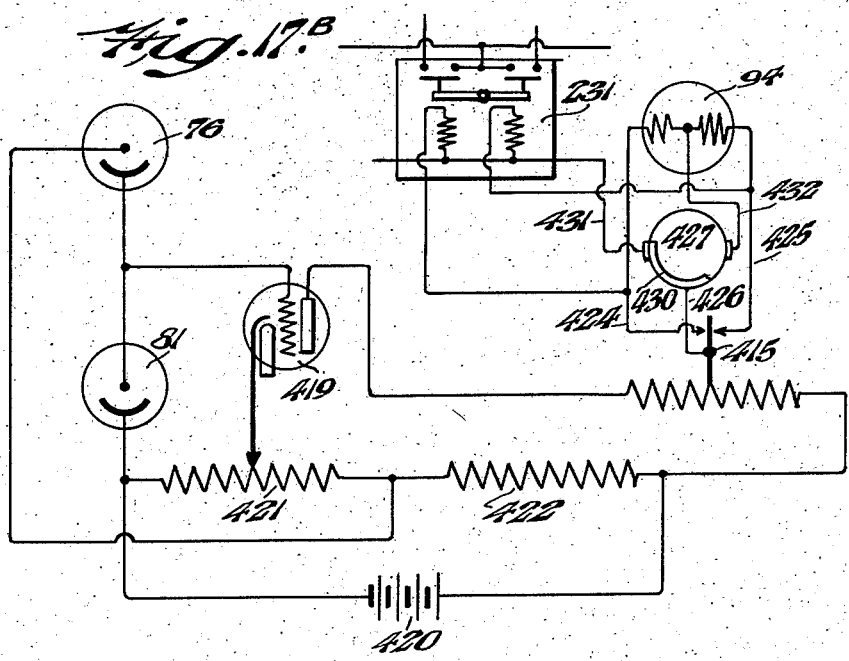

April 20, 1937.   J. C. CLARK   2,077,398
NAVIGATING INSTRUMENT
Filed Oct. 3, 1934   11 Sheets-Sheet 11

INVENTOR.
JOSEPH C. CLARK.
BY Frank H. Borden
ATTORNEY.

Patented Apr. 20, 1937

2,077,398

UNITED STATES PATENT OFFICE 2,077,398

NAVIGATING INSTRUMENT

Joseph C. Clark, Merchantville, N. J., assignor of one-half to The Ludington Corporation, Philadelphia, Pa., a corporation of Delaware, and one-half to N. S. Ludington Securities Company, Camden, N. J., a corporation of Delaware Application October 3, 1934, Serial No. 746,743

93 Claims. (Cl. 33—1)

This invention relates to navigating instruments and comprises a continuation in part of application Ser. No. 483,031, filed September 19, 1930, now abandoned.

It is among the objects of this invention: to predicate a new theory in view of which navigational instruments may be designed and upon which they may be actuated; to provide a method of determining latitude of position; to provide a method of determining longitude of position; to provide a method of determining longitude and latitude simultaneously; to provide a method and apparatus for determining latitude and longitude of a position simultaneously with a common instrumentality; to provide means for automatically determining longitude of instant position; to provide means for automatically determining latitude of instant position; to provide a device arranged for pointing at a fixed celestial body, and by the act of pointing to determine simultaneously the latitude and longitude of the position; to provide an instrumentality which is constantly responsive to changes of position of the craft in which it is disposed and which includes a recording mechanism for forming a permanent record of the craft's position in latitude and longitude at known time intervals; to combine in an instrument a device constantly responsive to changes of position of a craft to indicate the instant position thereof, with means positionable to represent the instant position and positionable to represent an objective, and automatically functioning to indicate a course from the instant position to the objective, with means responsive to the direction of the craft relative to the course indicated; to provide a device automatically responsive to a source of radiant energy to point at such source, with means operable pursuant to the disappearance of such source to operatively associate driving mechanism with the device; to provide a navigating instrument such that the pilot needs but set it for the starting position and for the objective to have indicated a true course to follow to reach the objective, and which is the true course from any instant position to the objective regardless of drift; to provide an electrically operated reversible step by step motor of general availability in the art; to provide an instrument by which the latitude and longitude of an observer's position can be determined automatically without mathematics and at any time of the day; to provide an instrument by which a course for a moving vessel to follow to reach a given destination is supplied continuously, automatically and without the use of mathematics; to provide an instrument by which automatically and without mathematics the distance of a craft from a given destination can be continuously indicated; to provide an instrument which indicates the course to a given destination automatically and continuously without mathematics, and simultaneously records the course actually followed on a chart; to provide an instrument which automatically indicates the course to follow to reach a given destination, the distance from the given destination, and which is not affected by drift; to provide an instrument which informs the navigator of all conditions as to course and distance he needs to know and which also makes corrections for the sun's declination, the refraction of light and the equation of time or any or all of those potential sources of error; to provide an instrument which mechanically and automatically resolves spherical triangles without mathematics; to provide mechanism such that an element points toward and constantly follows a moving source of radiation, and particularly the sun; to provide means automatically responsive to radiant energy of a celestial body to indicate a true direction with a navigating instrument responsive to the same radiant energy and to positioning relative to the said true direction to indicate continuously a course to an objective from an instant position; to provide a navigating instrument for determining instant position and/or a course to an objective by automatic pointing at a celestial body, that is substantially free of errors incident to rolling, turning, or pitching of the craft carrying the instrument; to provide means pointing at the sun as a function of latitude with means automatically correcting for declination; and many other objects and advantages as will become apparent as the description proceeds.

Figure 3:
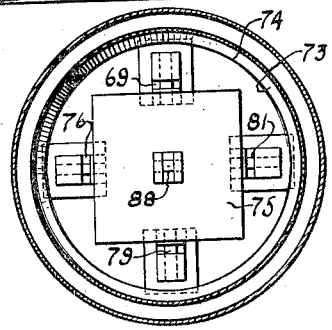
Figure 2:
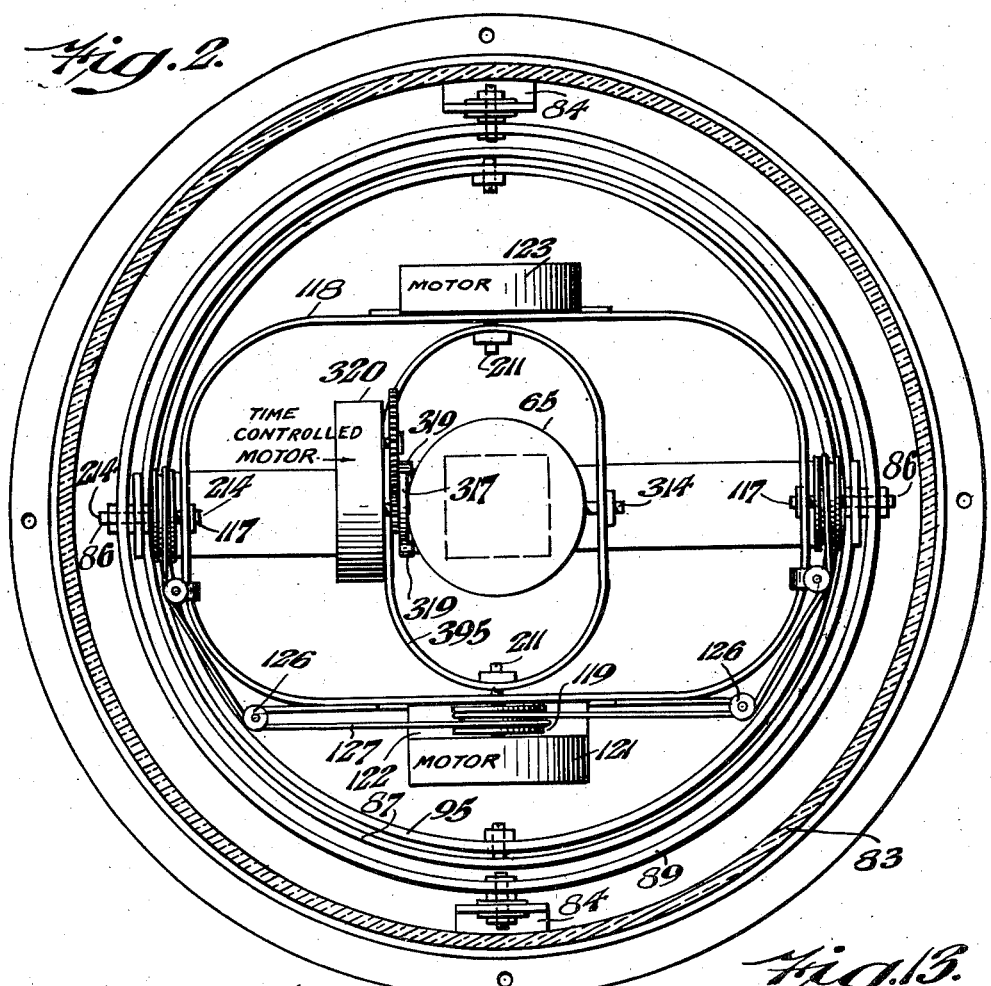

In the accompanying drawings;

Fig. 1 represents a vertical section, partially in elevation, of the "finder unit" of the instrument, Fig. 1a represents a transverse fragmentary vertical section, partially in elevation, of the "finder unit" of the instrument, Fig. 2 represents a plan of the device of Figs. 1 and 1a, Fig. 3 represents a transverse section on line 3—3 of Fig. 1 through the tube of the "finder unit" disclosing the relation of the photoelectric cells thereof, Fig. 4 represents a vertical section partially in elevation of a typical follow-up or reversible step by step ratcheting motor as used in the unit, and particularly as controlling the dials of the "distance indicator", Fig. 5 represents an elevation of the motor of Fig. 4, with the rear plate and plug removed, Fig. 6 represents a plan partially in elevation and partially in section of the "resolving unit" of the instrument, in a neutral position, Fig. 7 represents a diagrammatic view of the "resolving unit", in a position responsive to setting for longitude and latitude of position and objective and disclosing the adjustment of the resolving motors in response to such setting, Fig. 8 represents a vertical section partially in elevation of the "resolving unit" in the position shown in Fig. 6, Fig. 9 represents a front elevation of an illustrative form of instrument board, Fig. 10 represents a vertical section through the motor assembly, "course" dials and pointer, partially in elevation.

Figures 11, 12:
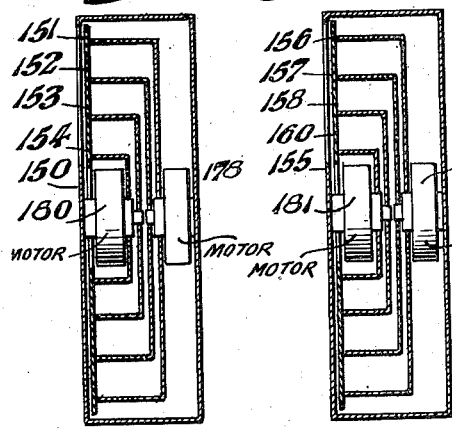
Figure 13:
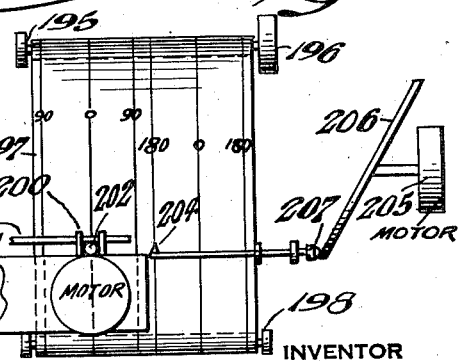
Figure 16:
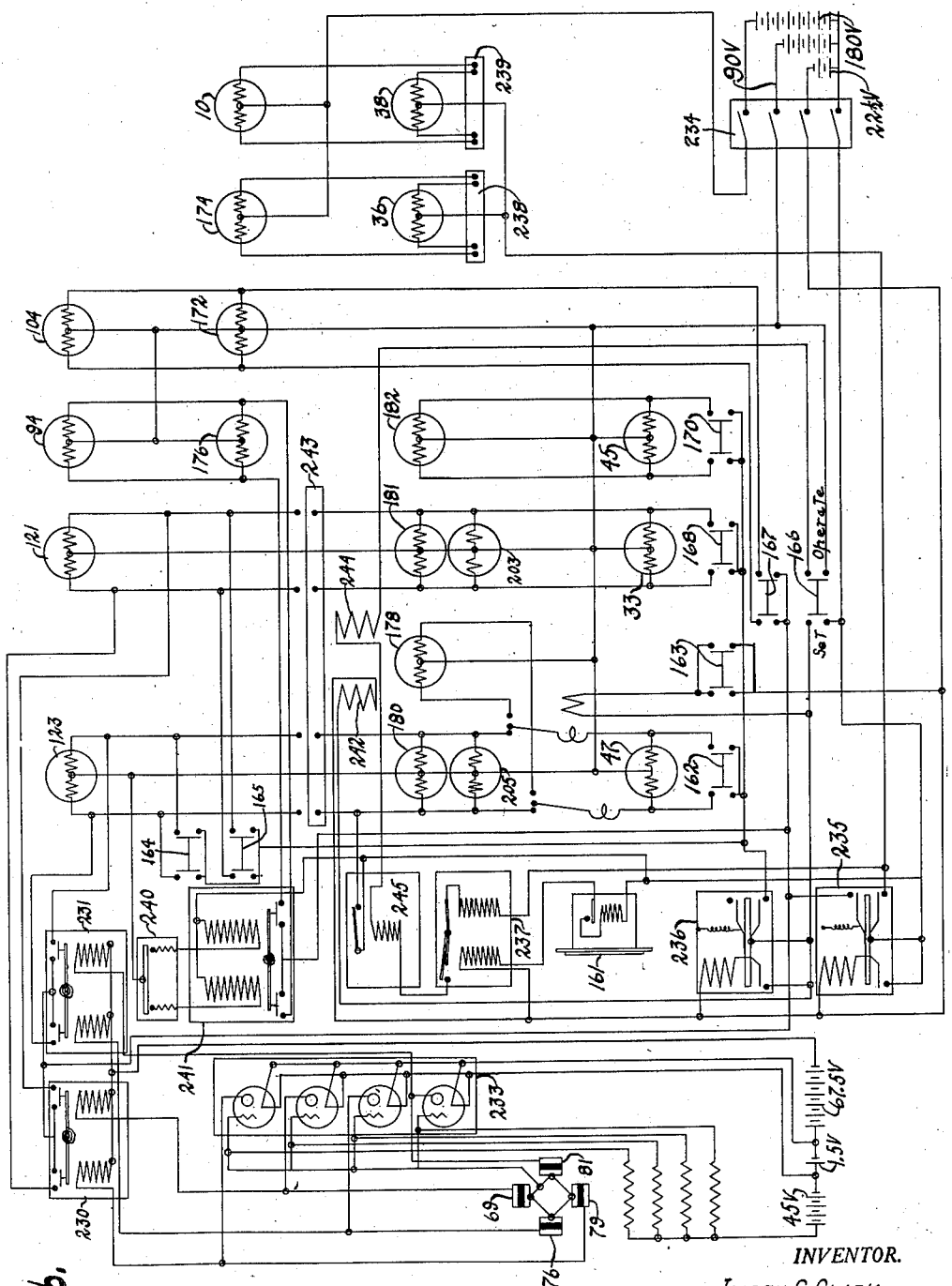
Figure 17:
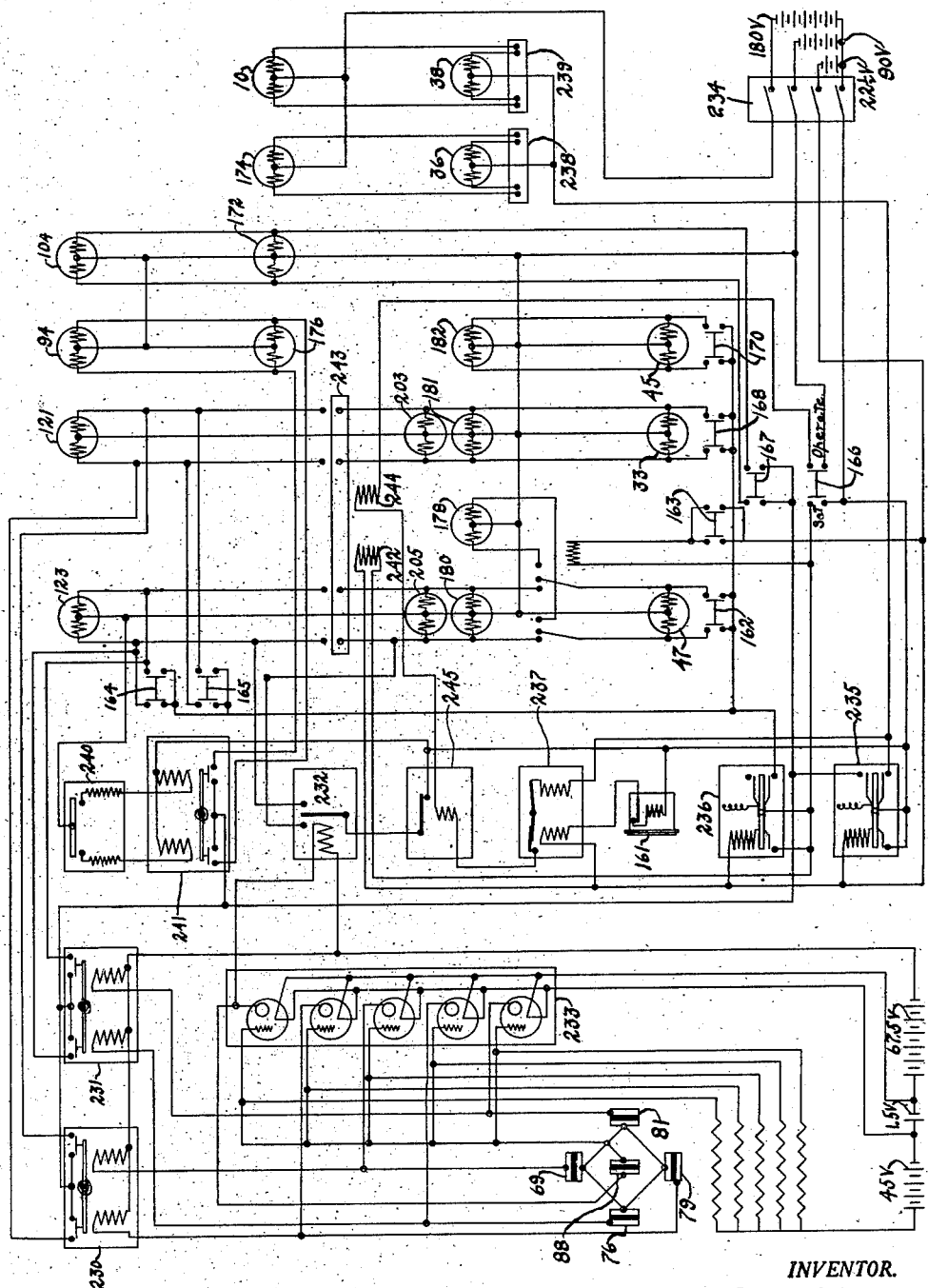

Fig. 11 represents a vertical section through the motor assembly and dials of the "longitude" indicator, partially in elevation, Fig. 12 represents a vertical section through the motor assembly and dials of the "latitude" indicator, partially in elevation, Fig. 13 represents a plan of an illustrative form of chart for recording position, Fig. 14 represents a side elevation partially in section through an illustrative form of interrupter or pulsator, Fig. 15 represents an end elevation thereof, Fig. 16 represents a wiring diagram of the assembled instrument particularly adapted for daylight use, Fig. 17 represents a wiring diagram of the assembled instrument particularly arranged for continuous automatic operation, Fig. 17a represents a fragmentary wiring diagram of a sun compass orienting system operatively associated with the orienting motor of the navigating instrument system, Fig. 17b represents a fragmentary wiring diagram of a relay system for alternately coupling the orienting system of Fig. 17a, with the tilting navigating system of Fig. 17, and Figs. 18 to 23 represent diagrammatically the stages in the development of a simplified instrument used to explain the theory of the invention.

As the instrument has been evolved and designed in view of a radically new theory, and as the operation of the illustrative form of the invention set forth herein is in accordance with such new theory, it would seem helpful to explain the theory in detail in connection with a hypothetical instrument, before the explanation of the illustrative form of operative instrument is undertaken.

*The theory of the instrument*

It may be noted that modern navigation recognizes the necessity for allowances for the declination of the sun, and the equation of time, as factors in many calculations that are made. Declination, as is well known, is the optical effect caused by the rocking of the earth's axis, giving the effect that the sun moves north and south of the Equator. This is accompanied by the phenomenon called the equation of time. Modern navigation requires that the observations of the sextant to determine latitude, and of the chronometer to determine longitude, be corrected according to the date, even to the hour, for the declination of the sun and the equation of time. It will be observed that with the instrument to be described the operator is not interested in the declination of the sun and equation of time, except from the standpoint of the variation of the apparent position of the sun from the time of starting to use the instrument to the time of completion, in the simplest form of the invention. A great lapse of time will obviously call for a greater correction than a small lapse of time and such correction is not a function constant to the lapse of time, but varies according to the time of year. As will be explained later herein, declination of the sun and the equation of time can be represented by simple harmonic motion incorporated into the instrument of the more complex type adapted for running for long intervals.

Although the lapse of time from one sunrise to the next constantly varies during the year, owing to the phenomena mentioned above, yet the mean day or average day is a constant function and can be accurately recorded by a clock. For purposes of exposition of the theory it will be assumed that a twenty-four hour clock, known as the French clock is provided. The hour hand of this clock obviously makes one complete revolution in twenty-four hours. Assume also that the sun is traveling relatively around the earth in a plane that is an extension of the Equator, and obviously making one revolution in twenty-four hours. If one takes the twenty-four hour clock to the Equator and sets it such that the hand of the clock travels in this plane, is pointing at the sun, and is traveling in the same direction as the sun seems relatively to be traveling, it will be obvious that the hand will continue to point at the sun during its entire revolution in a day of twenty-four hours, during both the day and night. At night the hand would naturally point below the level of the horizon, still it is pointing at the sun, for the sun is also below the level of the horizon. At high noon the sun is directly overhead and the hour hand of the clock would be at the top of its face corresponding to the position of the sun. At midnight the hour hand would be truly at the bottom of its face and the sun would be similarly directly beneath. At six and eighteen o'clock the sun would appear to be directly on the horizon and the hour hand of the clock would be exactly half way between its high noon and midnight positions. As one cannot be exactly in the center of the earth, but is at a point on its circumference, the hour hand would not actually point to the sun at this time, (six and eighteen o'clock), and a line drawn from the center or axis of the clock up through the point of its hand and out into space would not strike the center of the sun, but would strike a distance away from the center of the sun equal to the distance from the center of the earth to that point on the Equator at which the observer is positioned.

Thus it will be apparent that the clock hand is actually a true indicator of the sun's position only at high noon and midnight, and at all other times it is in error, the error increasing in magnitude from zero at noon and midnight, to a maximum at six and eighteen o'clock respectively. As the sun is some 93,000,000 miles from the earth on an average, while the distance from the center of the earth to a point on its circumference is only some 4,000 miles, therefore the error that is incurred is of the proportions of the angle whose sine is equal to 4,000 divided by 93,000,000, which if reduced to figures shows an error at its maximum of but a few seconds of arc. Obviously this degree of error is so infinitesimal as to be negligible. The clock described can therefore be used for determining the location of the sun. Obviously it can also be used to determine the position of any fixed star in the ecliptic. (The plane extending through the earth and into space in which the sun appears to travel.)

Assume now that the position on the Equator upon which the observer stands is designated as Greenwich. As is well known in astronomy, the Equator is divided into 360 equal parts, each part representing a degree of arc. Each degree has a number each way from Greenwich, or zero, numerically increasing to 180°, at which point the numbers coincide, having gone completely around the earth to a point diametrically opposite to Greenwich. These degrees of arc are divided into 60 equal parts in accordance with modern navigation and astronomy. These parts of a degree are called "minutes" of arc, or, in the language of the navigator, "knots".

Obviously the ecliptic plane may be considered to be divided into the same graduations, so that the angular relation of any known fixed star to the sun, assumed to be traveling in this plane, is also known.

With the clock at Greenwich or zero on the Equator, and running in the manner mentioned, it will be clear that if an imaginary line were drawn from the axis of the clock through the hand of the clock, and another imaginary line drawn from the axis of the clock to the center of the sun, and located in the plane of the hand, they would coincide as the hour hand is pointing at the sun. Without changing the mechanism of the clock, if one should suddenly move it to another point on the Equator away from zero or Greenwich it will be evident that the two lines would no longer coincide, but that an angle would be subtended between them of a magnitude equal to the number of degrees and minutes of arc that the clock had been moved from zero or Greenwich. In other words, if the clock is moved from Greenwich, one could measure the angle between the observed position of the sun and the hand of the clock, and thus measure the distance one has travelled around the Equator, or actually the longitude of the new position.

Longitude, as is well known, is defined as the angular rotary displacement of position from Greenwich. A meridian of longitude is defined as an imaginary line cut on the surface of the earth by a plane which passes through the earth and contains the earth's axis, that is the geographical axis about which the earth rotates.

Figure 18:
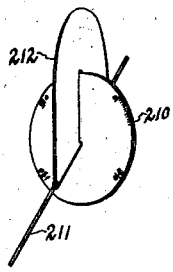

Referring to Fig. 18 assume that one substitutes for the hand of the clock a dial 210 peripherally graduated from zero each way to 180°. Setting the dial so that the zero lies in a line drawn from the axis of the clock to the sun, as at Greenwich, and with the dial simply taking the place of the hand that has been removed, it will be observed that by moving the clock to any other point on the Equator the zero point on the dial no longer indicates the position of the sun as the observer sees it, but is still recording the position as observed at Greenwich. A line drawn from the sun to the axis 211 of the clock will now cut the edge of the disc or dial at some setting other than zero, and from the foregoing explanation it will be clear that whatever graduation such line cuts will be the numerical value of the longitude of the new position. If one can determine where this line cuts the edge of the dial one can determine one's longitude at any time that the sun is visible, or for that matter, not visible.

To facilitate the determination of the intersection of such line with the graduated dial, assume that the axis 211 of the clock is extended each way a short distance on either side of the clock. Assume that one mounts on the extensions of the axis, a pivoted vane 212 in a plane containing the axis, cut away to allow clearance for the dial of the clock to which it is perpendicular in any angular position of adjustment. With the dial held in the plane of the Equator and the mechanism set so that at Greenwich the zero on the dial indicates the true position of the sun, then at any other position on the Equator the vane may be oscillated on its clock axis pivot 211 until the shadow cast by the vane on the dial is a line shadow. The vane having no thickness it will be understood that the vane lies in the line drawn from the axis of the clock to the center of the sun, and is therefore over the graduation on the dial which is the longitude of the new position. Obviously at Greenwich the line shadow would be over the zero. As the dial is rotated by the clock mechanism at the same rate of speed that the earth is rotating (and as the sun or a fixed star is relatively rotating), therefore as time progresses, both the vane and dial would progress, and the vane at Greenwich would always be over the zero. At 90° longitude, away from Greenwich but with Greenwich clock setting, the vane would lie over the 90° graduation on the clock dial provided that one moved the vane so that the line shadow was the only shadow cast.

Assume that while remaining on the same meridian of longitude, one moves away from the Equator, north or south. Provided one was not at either the exact north or south geographical poles (at which the lines of longitude coincide at a common point and cannot be distinguished one from another), then in such new position it will be clear that one can still set the clock in such a position that the dial 210 is parallel with the plane of the Equator. One can still rotate the vane until it is in such a position that the line shadow is cast, and one can therefore still determine one's longitude.

If the mechanism is returned to the Equator and is again changed so that for the vane which casts a shadow there is substituted a telescope 213 mounted to rotate about the axis 211 of the clock, still over the graduated dial or disc of the clock, and so that the line of vision of the telescope passes through the axis of the clock perpendicular to such axis, it will be apparent that when the telescope is moved about the clock axis 211 until the center of the sun shows in the eye piece of the telescope, then the telescope will lie in the line drawn from the center of the sun to the axis of the clock, and will therefore be over that graduation on the disc 210 which has the numerical value of the longitude of the observer's position on the Equator and relative to Greenwich. If the mechanism having the telescope substituted for the vane is now moved on a meridian of longitude north or south of the Equator, but short of the poles, and the clock disposed so that the disc on its axis is parallel with the plane of the Equator, it will be clear that although the telescope can be swung on the axis 211 of the clock, it will not be susceptible to pointing at the center of the sun. This is because the plane of the Equator in which the sun is supposed to be located is parallel with the disc or rotating dial of the clock.

In the preceding matter and that which immediately follows, the discussion omits, for the nonce, any effect upon the conclusions that might be occasioned by the declination of the sun. The theoretical assumption at present is that the sun moves constantly in a plane containing the Equator.

The last position of the elemental clock mechanism with the telescope is upon any given meridian of longitude, and in a position away from the Equator, in the direction of a pole. Observing that the telescope cannot aim or point at the center of the sun, it will be understood that it will be necessary to introduce into the hypothetical or elemental mechanism some means whereby the plane of the clock dial and of the telescope may also be pivoted about an axis 214 (Figs. 20 and 21) lying in a plane parallel to the plane of the Equator. When this is done one can now rotate the system until the telescope finds the center of the sun. At this moment the telescope will be over a graduation of the dial 210 that for all practical purposes will be the longitude of position. It might be noted at this point that the indication of the longitude of position just stated is not absolutely exact owing to the fact that the observer has moved from the Equator. However, this error is negligible, it having a magnitude at its greatest equal to the vector solution of the sine of the angle whose sides are the distance from the center of the earth to a point on its circumference, and the center of the earth to the center of the sun, and the sine of the angle of the perpendicular distance that the observer is from the plane of the Equator and the distance from the center of the earth to the center of the sun.

A plane may be defined by any three points in space which are not in alignment. From any position on the earth, except exactly at the earth's poles, an observer can pick out points on the horizon which he calls north, south, east and west. A fifth point directly overhead is known as the zenith. As the observer changes his position all five points change similarly. The points of the compass as they will be considered herein, are points on the celestial sphere; that is, the imaginary globe that one might consider the sun and the stars to be projected against out in space. An observer can imagine a huge plane determined by three points on the celestial sphere, none of which could be in a straight line. Such a plane might be comprised of the east point, the west point and the zenith. For the sake of explanation this may be referred to as the beta plane. There is another plane which will always remain perpendicular to the beta plane, which is defined by the north point, the south point and the zenith. This plane may be designated as the alpha plane. The zenith is a point on the line of intersection of both planes and moves as the observer moves.

Still disregarding the phenomenon called declination, one may consider that the sun rises in the east and sets in the west; that is, at the time it is first visible it is in the east point, and at the time of setting it is in the west point. At other times of day it has described, by its motion, a plane in space, and at successive intervals of time it is at some point in this plane, even though moving relatively to the observer. The plane in which it moves, however, is stationary. This plane will hereinafter be referred to as the sun plane. Disregarding declination, the beta plane and the sun plane are coincident at the Equator, but only at the Equator, as at all other points even at the geographical poles the two planes are intersecting but angularly divergent.

Under present navigating methods latitude is defined as the angle between two points, respectively, the sun and the zenith at high noon, which is the time when the sun is at the apparent top of its arch (due allowance being made for declination). The navigator measures this angle in degrees and minutes of arc and thereby determines his latitude. The instrument used is the sextant. Actually the navigator measures the angle between the sun and the horizon at high noon. This angle is subtracted from 90° and the result is the latitude of the position. He can find latitude at any time of the day by applying the proper mathematical solution to his observations. What he does theoretically, is solve the spherical triangle in existence at other times than high noon. This necessitates a mathematical solution which is simplified in practice by referring to known charts, tables, etc. What is actually done is to convert existing conditions at the time of the observations, to the conditions that would exist at high noon. The whole present theory of navigation is based upon the determination of points from which angles are determined. The theory of the instant invention contemplates that the sun at apparent noon is actually in the alpha plane, and the angle between the sun and the zenith, which is here supposed to be true latitude, is evidently also the angle between the sun plane and the beta plane. Naturally enough the beta plane remains stationary as long as the observer does not change his position; the sun plane likewise is stationary. Since it is evident that the angle between the sun plane and the beta plane at high noon is a measure of latitude, it is therefore evident that the angle between the two planes is a measure of the latitude at any time of the day, it becoming indeterminate only at the instant when the sun is either in the east point or in the west point.

Figure 19:
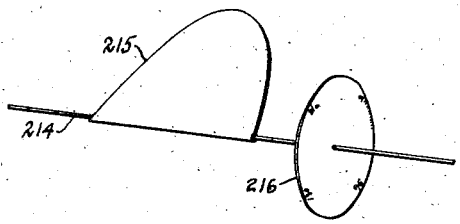
Figure 20:
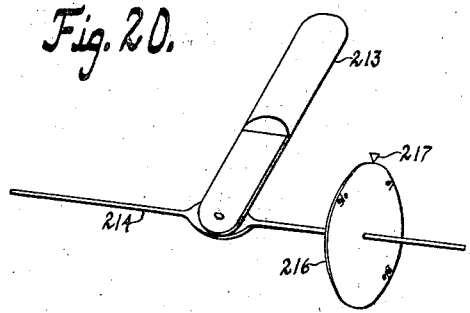

Referring now to Fig. 19, in order to determine the angle between the sun plane and the beta plane, one may construct a thin vane 215 so mounted as to be rotatable about an axis 214. If one holds this axis horizontal to the earth's surface and so that it points east and west, the vane may be rotated until the shadow cast by the sun is a line shadow, at which moment the vane will be lying in the sun plane, and therefore the angle of tilt of the vane from the vertical is a measure in degrees of the observer's latitude at any time of day. A slight error is evidenced here as the observer is not exactly at the Equator, due to the fact that the plane of the Equator which actually is the sun plane does not coincide with the sun plane as observed, in accordance with that same angle of error which entered into the theory by which the longitude of position was determined as above. This error at its maximum is again equal to the angle whose sine is the distance from the center of the earth to a point on its surface, divided by the distance from the center of the sun to the center of the earth. In order to simplify the measurement of the angle of tilt of the vane, one may construct a dial 216 similar to the dial with which in the theory one has determined longitude, except that this dial will be graduated from zero, in each direction to 90° at points 90° away from zero. This dial is mounted for rotation about the east-west axis with the vane. An indicator 217 for the vertical point may be suitably supported in juxtaposition to the dial. The angle through which the vane is rotated to cast a line shadow may then be read directly from the dial with reference to the pointer 217.

In order to determine the angle of latitude more accurately, the vane is discarded, and in its place a telescope 213 is substituted, mounted in the center of the east-west axis, and such that it is free to rotate about the east-west axis, as well as about another axis perpendicular to the east-west axis, (the clock axis 211 for instance), the telescope will then be free to move from side to side toward either the east or west points. By rotation of the telescope about the east-west axis and about its other axis to aim at the sun, it will be evident that relative to the east-west axis it will have rotated from the vertical a number of degrees equal to the latitude of the observer's position.

If one now assembles the clock mechanism used for determining longitude, on the same axis that the telescope rotates about in determining latitude, it will be observed that the conditions of both cases are fully met. When finding latitude one rotates the east-west axis and the axis of the telescope until the sun becomes visible in the finder. The rotation of the east-west axis has given the magnitude of the observer's latitude. The rotation of the telescope's axis (the clock axis) shows one where the line from the center of the sun to the clock axis cuts the longitude dial, which gives one the magnitude of the observer's longitude. Therefore by simply moving the telescope to such a position that the sun is visible through the eye piece, and providing conditions cited have been met, one has determined latitude and longitude simultaneously (Fig. 21).

It will be immediately apparent to astronomers and navigators that the readings obtained from the two dials, purporting to be those of latitude and longitude, are incorrect, unless an allowance is made for the declination of the sun in the case of latitude, and the equation of time in the case of longitude.

The declination of the sun varies according to a cycle, which so far as known is a function of time. The sun appears to move 23° 27' north or south of the Equator at a maximum. If no allowances were made for this declination it is readily seen that the hypothetical device could be this much in error at some time throughout the year. The correction for declination applies only to latitude from a practical standpoint. There must be added to or subtracted from the angle of rotation of the east-west axis an amount equal to the sun's declination in order to have a correct reading. This is best accomplished by changing or modifying the construction of the device, as shown in Figs. 1a, 2 and 21. By such change the telescope is mounted upon a supplemental axis perpendicular to the north-south or clock axis, and is, in the automatic operation of the instrument, coupled with some means capable of moving the telescope on said supplemental axis in accordance with the variations in declination. The declination being a function of time, and the change in declination being proportional to the sine wave, and the chronometer or clock being a recorder of the passage of time, a clock may be mechanically or otherwise coupled to the telescope such that the clock moves the telescope or sun pointer an amount equal to the sun's declination in simple harmonic motion, which represents such sine wave. In the instrument shown in Fig. 21, this may comprise the pitman 227 engaging the telescope at one end, and a time controlled crank arm 228 at the other, with the latter arranged for a complete revolution in one year.

Referring to Fig. 21, the east-west axis 214, carries the ring 387, which carries the inner ring 395, by means of the longitude axis means 211, perpendicular to the east-west axis 214, and arranged to indicate by pointer 312 the longitude on dial 210. The telescope 213 is journalled on an axis 314, which may be designated as "declination axis", in the inner ring 395. A dial 315 may be mounted rigidly on ring 395, and be graduated on each side of the vertical in degrees, relative to which a pointer 316 carried by telescope 213 is operative. It will be understood that declination axis 314 is perpendicular to longitude axis 211. It will be clear that if ring 387 is turned on axis 214 in accordance with latitude, as indicated by pointer 217, the telescope 213 will be adjusted on its axis 314 in accordance with declination, and on axis 211 for longitude, and telescope 213 will then point at the sun. While in Fig. 21, the relation of the parts and their axes is of the simplest, and one that is manually adjustable, for illustrative purposes, it will be understood that a pitman 227, or its equivalent will be coupled with the telescope 213, at one end, and with the time controlled crank 228 mounted on ring 395 at the other. If the arrangement is such that the limits of movement of the crank and pitman cause the telescope 213 to oscillate on axis 314 a total of 23° 27' on each side of a perpendicular relation, and if the crank rotates once in a sidereal year and keeps proper time, then declination is automatically taken care of in the construction of the device and need not be given any further consideration in such device, as correction for same will always be in evidence.

Likewise the equation of time is a function of simple harmonic motion, and can therefore be controlled by the same or similar clock mechanism.

With the hypothetical or elemental instrument so described, and with all conditions met as recited, the observer can determine both his latitude and longitude at any time by the one function of pointing the telescope at the sun, or at a fixed star, and without the necessity of using any mathematics.

Consider the earth, or a globe representing the earth, inscribed with imaginary lines parallel with the great circle of arc called the Equator, and delineating meridians of latitude, and also inscribed with lines through the poles, designated as meridians of longitude. Assuming the selection of any two points on the surface of the globe, it will be clear that if imaginary lines were drawn from each point to the center of the earth, the angle made by the lines would be a measure in degrees and minutes of arc of the distance between the two points on the surface of the globe. This value treated mathematically would indicate the distance between the two points in any units, such as miles, that would be convenient for the purpose. Assume that the two hypothetical points are a starting point at New York and an objective point at Los Angeles. To start on a course between the two points, one should start on a course that would be at an angle equal to the angle between the meridian of longitude passing through New York, and the great circle of arc one may inscribe on the globe between New York and Los Angeles. A plane is defined by the points New York, Los Angeles and the center of the earth. A second plane is defined by the point New York and the axis of the earth or the globe, which contains the center. The angle between the meridian passing through New York and the arc of great circle connecting New York and Los Angeles is the same as the angle existing between the two planes just mentioned. If one could determine this angle at any time one could determine the instant course to follow in traveling from New York to Los Angeles. If one could determine the change of position, and therefore the line from the new position to the center of the earth or globe, one could always know the distance to the objective, regardless of how far from the original course one might have drifted.

Figure 22:
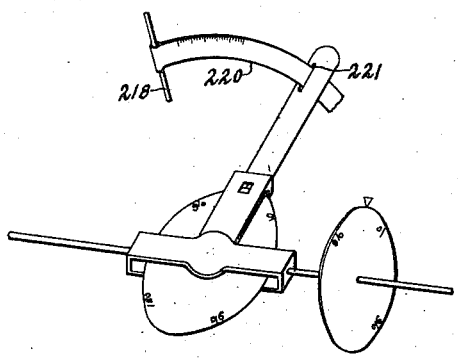

Referring again to the elemental instrument including the telescope, dials and clock, in which the telescope has universal motion, and to Fig. 22, if the clock is stopped, movement of the telescope will result in readings on the dials which change for every move of the telescope, on its two axes. If one moves the telescope until the dials give a reading representing the latitude and longitude of New York, the telescope will be assuming a relatively arbitrary position which is definite relative to the rest of the hypothetical or elemental apparatus. One can construct an arm 218 which may be mounted in the position assumed by the telescope in accordance with the dial readings for latitude and longitude of New York and maintains that position. If now one moves the telescope about the universal center of the instrument until the dial readings are in accord with the latitude and longitude of Los Angeles, the objective, one has set up or established the conditions which determine the distance and the course to follow if it were desired to travel from New York to Los Angeles. The telescope represents the line from Los Angeles to the center of the earth, and the arm set up in the instrument represents the line from New York to the center of the earth, and the angle between the two is equal in degrees to the distance in degrees between New York and Los Angeles. It will be observed that the arm and telescope have been positioned in accordance with the respective positions of the starting point and objective, and in determinable relation to the east-west axis. To simplify the measurement of the angle between the two points one may construct a scale 220 which has a curvature equal to the radius of a circle as determined by the distance from a slot 221 in the telescope to the universal center of the instrument or dial. This obviously could be a complete ring. The scale or ring will be mechanically connected to the arm such that it is free to swing around a line from the end of the arm to the universal center of the instrument, and will pass through a slot in the telescope. The scale will be graduated at an edge in degrees and minutes of arc. As shown in Fig. 22, the distance between New York and Los Angeles can now be determined by counting the number of graduations between the fixed arm and the telescope. Providing the fixed arm is zero, and the graduations are numbered therefrom, the distance between the points can be determined by reading that graduation in the center of the slot in the telescope. It is of importance and will be appreciated that as the arm and telescope occupy definite positions relative to the east-west axis, the scale will also occupy a definite position in determinable angular relation with respect to the east-west axis which is the direction that Los Angeles lies from New York.

However, it is evident that the angle between the scale and the east-west axis is only the starting course from New York to Los Angeles, or the course at the moment of starting, because the angle with respect to the north and south meridian changes as one follows this course, unless it so happens that the course lies exactly along the Equator or one meridian of longitude.

From the original theory of a method of determining latitude and longitude, it should be noted that it was not necessary for the observer to stand still in order to determine his instant position, but only necessary to keep the telescope pointed at the sun or other celestial body. Having determined a position and objective by moving the telescope until it shows the objective position; maintaining the position always as an objective, then reversing the condition, that is, putting the fixed arm in the objective position, then returning the telescope so that it points to the sun, one can start out to travel to the objective. As one travels, however, he keeps the telescope constantly pointing to the sun. This establishes the position constantly, even though where he is traveling is no longer New York but some position on the course between New York and Los Angeles. By the movement of the telescope one determines his position throughout the course in terms of latitude and longitude. By the addition of this curved scale one determines the distance that one is away from the objective throughout the course and the course to follow in order to reach that objective (which quite evidently is a constantly changing course), providing one continually trains the telescope on the sun. In summation; by the one act of pointing the telescope to the sun or other fixed celestial body and maintaining all the conditions that have been cited throughout the development of the theory, one has determined latitude, longitude, the distance to the objective, and the proper course to follow; simultaneously, at any time of day and without the use of mathematics.

Assume the provision of two pencils 222 and 223, with preferably each end of both pencils sharpened to a point, and needles 224 and 225 inserted perpendicularly into the respective pencils an inch or so from the respective points. Through the eyes of the needles a piece of rubber 226 is drawn, connecting the pencils, and creating tension between them. The ends of the pencils adjacent the needles are placed such that they are close together yet free to rotate without slipping apart, and one has the conditions shown in Fig. 23. With a finger of each hand the free ends of the pencils may be engaged and each pencil may be swung freely about the universal center. If the pencils are moved so that their axes lie in the same straight line, there will be no tendency of the pencils to rotate about their respective axes. If the pencils are moved so that their axes do not lie in the same straight line, then the system formed of the pencils will be urged to rotation, and each pencil will rotate until its axis lies in a common plane with the needles and until each lies in a fixed position, depending entirely upon how one's fingers are held. Actually any non-alignment of the pencils out of an established plane, causes rotation of both pencils until the needles, the rubber or elastic and the points held in the fingers and the point where the axes of the two pencils intersect as though in a universal joint lie in a common plane. This plane being established, movement of either pencil about the universal center, but in the same plane, causes no further rotation of the system. If, however, either pencil is moved out of this plane, the system will again rotate until the new fixed position is found. It will be found that the pencils themselves are actually made to rotate. If the fingers are moved such that they describe a circle around a line which would be common to the axes of both pencils, the whole system rotates. If in place of the pencils one had two shafts about each of which was a tube free to rotate, the shafts could be moved to any position with the result that the tubes would rotate relatively to the shafts, assuming some such tensioning device as the needles and rubber or elastic were associated with the tubes. This latter system makes it possible to resolve spherical triangles automatically; it also makes it possible to resolve such triangles constantly automatically as the conditions of triangles change.

When determining accurately the course to steer a vehicle, ship, or craft, the navigator solves the spherical triangle. The three points of his triangle are his location, his objective, and a pole of the earth. From his known latitude of objective and position, he determines the length of two sides of a triangle; from the difference in longitude of the two positions he determines the angle between these two sides. By applying spherical trigonometry to this known data he solves for the distance between the two locations and the angle with respect to a north-south meridian that he wishes to steer when beginning his course. These functions are presumed or assumed automatically by the devices described and those to be described later herein.

To facilitate the understanding of the relationship of the elemental parts disclosed in developing the theory, it might be observed that pencil 222 may take the place and angular position of arm 218 in Fig. 22, while pencil 223 may take the place and angular position of the telescope 221, and the action of the rubber band in rotating both pencils until the needles, the rubber, and the universal center of the system lie in a plane determining the course to start from New York to Los Angeles, may take the place of the function of scale 220 in Fig. 22. Of course the pencils cannot actually replace the arm and telescope owing to the fact that two things cannot occupy the same space at the same time, but if one therefore starts the zero point between the axes at 180°, as is done with the pencils, the analogy becomes complete.

The invention includes devices positionable in accordance with the latitude and longitude of the starting point and of the objective, means for resolving mechanically the spherical triangle existing between the position, the objective and an earth pole, means for indicating the angles and the resultant course, means constantly and automatically responsive to the change of the observer's position, and means for indicating both the instant position and the distance to the objective.

While the instrument is available for purposes of navigating any moving vessel, it will be described in its assembly for use in aircraft, and preferably for an instrument that runs for short periods only, instead of continuously. No real change is required for a continuously running instrument but the existing slight factors of error which are inconsequential in aircraft within perhaps a week of running, would be somewhat multiplied if running for a much greater period, and would require correction from time to time.

Before enlarging upon the main body of the invention it might be well to describe the preferred sort of actuating element, which in one form or another, underlies the operation of the unit, and which, being thoroughly understood, will facilitate the understanding of the dependent operating parts.

The actuating element is a form of follow-up or step by step motor, of which there are a number used throughout the mechanism, as the operating mechanism for the various units. They are usually electrically coupled in pairs and the arrangement is such that while one of the pair is actuating an element in the instrument the other of the pair is synchronously actuating directly or indirectly the indicating dials or other indicating mechanisms.

Referring now to Figs. 4 and 5, the construction of a preferred form of follow-up or step by step motor is disclosed. To simplify the disclosure, a specimen motor such as actuates and controls the setting of the distance indicator 146, will be described. In the annular casing 10, generically designating the entire assembly as the motor, there are mounted two curved electromagnets respectively 11 and 12, which are energized by current from an external source. Three wires run to each motor, of which a single wire runs to each magnet coil and the third wire is neutral and common to both magnets. Current passed through the neutral wire and either one of the single wires energizes that magnet to which the single wire connects. Concentric with the casing 10 is a rotatable spindle 13 journalled in the rear wall of the casing 10, and upon the spindle is rotatably mounted a bushing 14, carrying the oscillatable armature 15. The armature has one end normally spaced between the adjacent ends of the curved magnets, at the other end carries the flexible double pawl or spring arm 16. As may be noted, the pawl has the inturned spring ends 17 and 18. The armature is normally held in mid-position by the opposed springs 20 and 21. A toothed wheel 22 rotatably mounted on the spindle is normally engaged on its outer periphery by both inturned pawls 17 and 18 and locked thereby against rotation. Fixed cams 23 and 24 are disposed adjacent the respective inturned ends of the pawl. Upon energization of a magnet, say the left hand magnet 11, the armature is swung to the left thus oscillating the armature on the bushing, and swinging the pawls or spring ends to the right. The inturned end of the pawl 18 remains in engagement with the teeth of the wheel 22, while the pawl 17 rides upon the cam 23 out of engagement with the teeth of the wheel, and the pawl 18 therefor moves the toothed wheel to the right one tooth. As soon as the circuit through magnet 11 is broken, however, the armature swings to its normal mid-position and pawl 18 rides over the adjacent tooth and settles behind it, and pawl 17 extends out over the cam 23 and settles in the next notch on the wheel, and the toothed wheel is held stationary in locked position by both pawls. Similarly energization of the magnet 12 causes the toothed wheel 22 to be advanced one tooth to the left.

While the number of teeth on the toothed wheel 22 and on the associated gears is purely arbitrary, they do have a certain relation to some of the other mechanism to be described, and in order to bring out the relationship they will be described in detail. It will be apparent as the description proceeds that any other similarly related synchronized movement might be availed of.

It is preferred therefore, that toothed wheel 22 have eighty teeth. Thus a single energization of either magnet 11 or 12 moves the toothed wheel 1/80 of a revolution.

Mounted on the toothed wheel 22 is a pin 25, fastened to the wheel, as by riveting or welding, or the like. An eighteen toothed, idler pinion 26 is rotatably mounted on the pin 25. The idler pinion is in mesh with two internal gears 27 and 28 simultaneously. Internal gear 27 has seventy-one teeth, and is held rigidly in and by the casing 10 of the motor. Internal gear 28, on the other hand, has seventy-two teeth and is free to rotate. This gear has the same pitch and outside diameter as gear 27, and is rigidly connected to a plate 30, which is mounted rigidly on a hub 31, rotatably mounted on the extended end of the spindle 13.

It will be observed that as the toothed wheel 22 is advanced step by step by the action of a given magnet, it carries with it the eighteen toothed pinion gear, which in turn is in mesh continuously with both of the internal gears 27 and 28. Since, on the fixed internal gear 27 there is one less tooth than on the rotatable internal gear 28, then for one complete revolution of the toothed wheel 22 the free internal gear must move one tooth relatively to the fixed internal gear, and in the same direction as toothed wheel 22. As it requires eighty energizations of a magnet to advance the toothed wheel one revolution and the rotatable internal gear one tooth, and there are seventy-two teeth on the rotatable internal gear, it therefore requires 72 times 80 or 5760 energizations of a magnet to cause one complete revolution of the internal gear 28 and therefore of the hub 31 driven thereby. As the central spindle 13 of the motor extends outwardly beyond the hub 31, it will be seen that anything mounted on the spindle will rotate 72 times as fast as the hub 31 or devices carried thereby.

The motors substantially as described, although in certain instances changed in the construction of the spindles, serve generally to synchronize various units in the instrument. Assume for instance that we wish to turn a wheel through 90°, and we wish also to turn another more or less remote wheel through 90° either similarly or oppositely but synchronously, it will be obvious that we may mount each wheel on the respective hubs of a pair of these motors. We place an interrupter in series with an energizing circuit which contains a given magnet of each motor in parallel with each other. Then by closing the circuit through the interrupter, or otherwise causing a series of power pulsations in the line, it will be apparent that both follow-up motors will be caused to ratchet step by step in the same or different directions and to the same degree, and therefore that each wheel will be turned through the desired number of degrees. The pulsator or interrupter is simply a device for making and breaking electric contacts with a desired degree of rapidity, and its construction will be obvious. An illustrative form of interrupter is shown in Fig. 14 and described later herein.

For illustrative purpose the follow-up motor shown in Figs. 4 and 5 has a dial or the like 146 shown as mounted on the spindle and a dial 147 mounted on the hub. This assembly forms the "distance" indicator of the instrument panel to be described.

*The resolving unit*

At a convenient point in the vessel or ship to be navigated, and, in the particular installation in the aircraft, there is provided a fixed bracket 19 (Figs. 6 and 8), having an arcuate portion horizontally disposed, in the normal position of the aircraft, and providing a fixed bearing 32 in axial alignment with a follow-up motor 33, the casing of which is fastened to the bracket 19. The motor 33 carries a movable arcuate bracket arm 34 on the rotatable hub thereof, the free end 35 of which is pivotally connected to the fixed bearing 32 of the fixed bracket. It will be observed that motion of the motor 33 moves the arm vertically about a horizontal axis. Bracket arm 34 carries at its central portion a rotatably mounted follow-up motor 36, the mounting of which will be described in detail hereinafter, the axis of which is perpendicular to the axis of the motor 33, and the casing of which carries a yoke 37. The legs of yoke 37 pivotally support, at 29, a motor 38, the central motor of the unit and which may be deemed the "distance motor", in the center of the axis of which lies the universal center of the resolving device or unit. It will be observed that motor 38 is oscillatable as a whole about an axis parallel with the face of motor 36, and, through rotation of the yoke 37 with motor 36, has universal positioning. Motor 38, mounted for oscillation in the yoke 37, carries oppositely disposed concentric bearings respectively 40 and 41, to which the freely pivoted secondary yoke 42 is connected by pivot pins 39, and which secondary yoke is pivotally connected on an axis perpendicular to the axis of motor 38, to a secondary arcuate bracket arm 43, at 44. The secondary bracket arm 43 is mounted for oscillation on and with the hub of motor 45, the axis of which is in a horizontal plane, and which motor is mounted on an oscillatable secondary arcuate bracket 46. The latter is mounted on the hub of a motor 47, mounted on an arcuate fixed support 48, an extension, preferably, of the bracket 19. It will be observed that the series of arcuate brackets and motors disclosed provide a universal adjustment for the central motor 38.

The central motor 38 carries on its hub an insulating washer or disc 50, as of vulcanized fiber, to which is connected a contact 51 and, in spaced relation thereto, a contact 52. Contact 51 is in a circuit with an appropriate magnet in motor 38 as well as with motor 10 behind the distance dial previously mentioned, and is arranged to close a pulsating circuit through both motors to cause movement of both motors in the same or opposite directions according to the graduations on the dials. Contact 52 is similarly in a circuit with the other magnet of motor 38, and with the other magnet of motor 10 behind the distance dial as noted, to cause movement of both motors simultaneously in the opposite directions to contact 51. Mounted concentrically with a pivot pin 39 and adjacent one leg of the secondary yoke 42, is a double contact 53, arranged to engage either contact 51 or 52. The double contact has an arm extending toward the closed part of yoke 42, to which it is connected by a spring 54. It will be observed that relative movement of the insulating disc 50 and the yoke 42 will cause engagement of contact 53 with either contact 51 or 52, and close a circuit therethrough.

Motor 36 is mounted for free rotation relative to the bracket arm 34 by means of a spindle 3, and anti-friction element 4 and the hub thereof carries an insulating disc 5, upon which are mounted spaced contacts 6 and 7. A pivoted double contact 8 is mounted concentrically of the axis of the motor, and is resiliently held in a relatively fixed position by a spring 9 engaging between the pivoted contact 8 and the bracket arm 34. Contact 6 is in series with the appropriate magnet of motor 36 and with a designated magnet of the motor 174 of the series of motors behind the course indicating dial 141, to be described, while contact 7 is in series with the other magnet of motor 36 and the other magnet of motor 174 behind the course indicating dial. It will be observed that relative movement of the motor 36 and disc 5 carried thereby, and the bracket arm 34 will cause engagement of the double contact 8 with one or the other of the contacts 6 or 7.

In order to effect relative movements between insulating disc 50 and yoke 42, and between insulating disc 5, carried by motor 36 and the bracket arm 34, there is provided a tensioning device. This consists of an arm 35 rigidly mounted on the secondary yoke 42 and perpendicular to its longitudinal axis which is coincident with the axis 44 thereof, and which arm carries a sheave or pulley 56. Idler pulleys or sheaves 57 and 58 are mounted on the respective legs of the yoke 37 relatively close to the motor 36, with the grooves thereof in a plane central of the yoke 37 passing through the axis of motor 36 and therefore passing through the theoretical axis of the yoke 37 which is coincident with the axis of motor 36. A pulley 60 is mounted centrally on one leg of the yoke at its pivotal engagement with the motor 38 at 29, so that its axis is perpendicular to the axis 29 of the pivotal support of the motor. Mounted on the insulating disc 50, and movable therewith, is an arm 61, carrying a pulley 62 close to the pulley 60 on the leg of the yoke. A cable 63 is anchored to the leg of the yoke 37 adjacent the pulley 60, passes over pulley 62, then back over pulley 60, then over pulleys 57 and 58 on the yoke 37, then stretches over motor 38 in the median plane thereof in the neutral position shown in Figs. 6 and 8, then over sheave or pulley 56 on the arm 55, and down to spring 64, anchoring the end of the cable resiliently to the secondary yoke 42. The resilient tension on the cable is the mechanical agency by which the spherical triangle presented by the unit is resolved; a spring engaged between the upper end of arm 55 and yoke 37 at the location of pulley 57 would serve the same end. The operation of the resolving unit will be explained after describing certain of the auxiliary and complementary units of the instrument.

Figure 23:
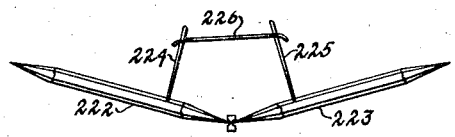

It may be noted that the axis of yoke 37, being responsive to positioning in accordance with the latitude of the starting or instant position, may represent the fixed arm 218 in Fig. 22, explained in the theory of the device, and also may represent the pencil 222 in Fig. 23, in the theoretical explanation of the resolving unit. The axis of the secondary yoke 42, being positionable in accordance with the difference in longitude between the starting point or instant position and the objective, as well as in accordance with the latitude of the objective, may represent the telescope in Fig. 22 of the theoretical explanation, and also the pencil 223 in Fig. 23 of the theory. In the same manner, the cable 63 takes the place of the rubber 226 of Fig. 23, arm 55 and pulley 57 on yoke 37 take the place of the needles 224 and 225. Motor 38 takes the place of the arcuate scale 220 in Fig. 22, and motor 36 is a measure of the angle through which the resolving unit rotates to resolve the course between the starting point or instant position and the objective. It will thus be observed that the individual devices which may, in the theory, be provided to attain desired ends, are in the operative form of device illustrated combined into a practical single instrumentality.

*The finding unit*

This unit, which is located at any desired point on the vessel or craft to be navigated, and may be spaced from the resolving unit, consists essentially in a device arranged to point, automatically or manually, at a fixed celestial body, such as the sun, or at any source of radiant energy, and operatively associated with devices positionable in accordance with pointing movements of the device. The device which is pointed being arranged either for a limited oscillation or for continuous rotation about 360°.

Referring to Figs. 1 and 2, for purposes of the finder there is provided a tube 65, the upper end of which may have a closure such as 66 of such material as ebonite which will transmit only the infra-red rays of radiant energy and has a preferably square slot 67 formed in an otherwise opaque permanent shutter 68, the inner surface of which, surrounding the slot being polished and reflective. The central portion of the tube supports an internally treated non-reflecting hollow preferably square box 70, the dimensions of which transversely are a little larger than the slot 67. The box is held in spaced relation to the walls of the tube, in any desired manner, and the outer surfaces thereof are preferably highly polished so as to reflect radiant energy, as is the adjacent spaced inner surface of the tube. Between the upper end of the box 70, and the shutter 68, there is provided a partially parabolic reflector 71 with an open end 72 larger than the slot 67, and with the lower end merging into the wall of the tube 65. A conical reflector is inverted in the tube below the box as at 73, with its open end 74 terminating close to a longitudinally adjustable but relatively fixed reflector 75. This reflector is also preferably square and is of the same size and in registry with the slot 67, and is so arranged that with the longitudinal axis of the tube pointed directly at the center of the sun or other celestial object or source of radiant energy, the rays therefrom pass through the slot 67, through the square box 70, and being incident upon the reflector 75, are reflected longitudinally of the tube out through the slot 67 again. Thus there is no action of any sort if the tube is properly aimed, except for the reflection of the rays out of the tube.

There are provided a plurality of tube actuating photoelectric cells, preferably four in number, disposed radially of the longitudinal axis of the tube and radially beyond the protecting edges of the reflector 75. There are only two illustrated in Fig. 1, but the other two will be arranged perpendicular to the two shown in a common plane perpendicular to the axis of the tube as shown in Fig. 3. In Fig. 1 at the left hand side there is shown such a cell 76, mounted on a block 77, the radial positioning of which is determined and is variable by a set screw effective upon an inclined surface 80 of the block. This is illustrated as a light sensitive bridge such for instance as a selenium cell, which normally resists the passage of a current and becomes a better conductor when the surface is energized by radiant energy, as is, of course, well known of such cells. In substantial radial alignment with the cell 76 diametrically of the finder tube 70 is a cell 81, similarly mounted, and additional adjustable cells 69 and 79 are disposed diametrically in a line perpendicular to the line of cells 76 and 81.

The arrangement of the finder tube and its component parts is such that the entrance of rays that are in slight angular relation to the longitudinal axis of the tube causes the square beam of light to be slightly eccentric to the reflector 75, and therefore causes a portion of such square beam to be incident upon one, and usually two, of the light sensitive or photoelectric cells, depending upon the angle of entrance of the rays into the square slot 67. That portion of the angularly inclined square beam that is incident upon the reflector 75 is reflected toward the mouth, and is incident upon and reflected from the reflecting surface of the closure shutter 68, and impinges upon the one or two photo-electric cells already energized by the eccentric portion of the square beam, to increase the effective radiant energy affecting such cells, by adding reflected rays to those directly incident thereon. It should be observed, moreover, that if the rays of radiant energy are incident upon the end of the tube at such an angle that the beam cannot enter directly to impinge upon the reflector or any photo-electric cell, then the parabolic reflector 71 comes into play to reflect such angular rays longitudinally of the tube, to impinge upon the desired photo-electric cells.

It is preferred that the cells be such as are responsive to infra-red rays, and that the closure for the tube be such as to transmit only such rays. This factor renders the finder completely operative during the daylight hours, substantially independent of whether or not, through storm or other adverse conditions, there is any visible sunlight, it being recognized that the infra-red rays pass through haze and clouds with comparative ease. This also serves to prevent the tube being responsive to stray beams of light such as from beacons and the like.

It will be clear that the above discussed eccentricity of the rays and the consequent energization of the cells on one side of the tube will, through a milliammeter relay and a single audio stage of amplification, cause the actuation of a motor controlling the position of the tube, or of two motors operable in perpendicular planes to cause two simultaneous motions of the tube to move the tube to a position in which the rays are again parallel with the axis of the tube, which, being attained would deenergize the cells and stop the actuation of the motors. This is accomplished by the mechanism to be described.

It will be understood, therefore, that those photoelectric cells in the tube 65 lying in the longitudinal median plane of the rectangular cradle, namely, 76 and 81, control respectively, the two magnets in motor 123, motor 47 of the resolving unit, and motor 180, to be described, while those lying perpendicular to the first two 69 and 79, control respectively the two magnets in motor 121, motor 33, and motor 181, to be described.

For certain purposes there will be provided a fifth photo-electric cell, preferably disposed in the longitudinal center of the tube on the reflector 75, although as will be clear, it may be located in any other operable position desired. This cell, which is shown as located on reflector 75, as 88, has a function, the control of a relay of any desired sort to control the automatic functioning of the device, and to engage and disengage time controlled driving elements with the finder tube. Thus the fifth cell, 88 is, of course, energized during the time that the radiant energy is incident upon the tube. It is effective, however, to disconnect the other photo-electric circuits from motor 123, when the source of the radiant energy disappears, as when, for instance the sun sinks below the horizon. The de-energization of the cell 88 immediately operates a device which couples motor 123 with the clock circuit but uncouples motor 47 and its coordinated instrument dial from the clock circuit, so that during the period of radiant inactivity the finder tube will continue to rotate about the axis of motor 123, at a speed timed and coordinated with the speed of the rotation of the earth, as will be clear, without affecting motor 47, etc. This extra photo-electric cell also, simultaneously with the establishment of a driving relation between the clock and the motor 123, disestablishes circuits to the motors in the resolving unit and on the instrument panel, which are responsive to the change of position of the craft as manifested up to that moment by the automatic actuation of the finder tube. Thus during the night, except as the operator may arbitrarily change the setting of the position indicating devices in accordance with the true position he may attain according to his recognition of land marks and the like, or by pointing the finder tube at a celestial body manually, the position responsive devices remain inactive and indicate the position at the time the finder's automatic action ceases, and thus its automatic setting of the instruments for the position ceases. However, when there is again sufficient radiant energy incident upon the finder tube, as to indicate that the photo-electric circuits can function automatically, the fifth cell 88 is again energized simultaneously with the energization of the other cells to disengage the clock circuit from motor 123 and also to engage the position responsive motors with the photo-electric circuits through motors 121 and 123. Assuming that the position has changed during the night, or during the disappearance of the source of radiant energy, the finder tube when first coupled with the position devices will be positioned in accordance with the position last indicated by the dials, normally, in the absence again of the setting of the devices by the pilot, but obviously the finder tube will not at that moment be pointing at the sun or source, as the position has been changed.

As soon as the automatic coupling takes place, however, the finder tube is automatically swung on its two axes until it again points at the source or the sun. Obviously such actuation of motors 121 and 123 as is necessary to achieve the result of pointing at the sun, will have actuated the position responsive devices through a degree equal to the distance traveled since the instrument was last automatically actuated, and thus will immediately thereafter indicate the true position of the craft, regardless of the drift or other adverse factors affecting such position. This of course is one manner of attaining a constantly operating device.

To a base 82 there is attached a housing 83 the upper end of which is closed by a glass dome 89, and to the inner surface of which housing, at diametrically opposite points there are attached lugs 84, forming the bearings for a floating frame or rocker 85, which in turn has bearings 86 diametrically disposed perpendicular to the axis of the bearings in lugs 84, on which is journalled a floating ring 87. This assembly, or its equivalent, is universally designated as a "gimbal" suspension. The last mentioned ring carries the suspended frame 90, carrying at its center an insulating bushing 91, and the raceway 92, and within which latter a shaft 93 is rotatably mounted. The shaft 93 at the upper end is tubular so as to house flexible connectors (not shown) running to the various motors and extends upward through the hollow spindle of a motor 94 mounted at the bottom of the suspended frame 90, and connects to a rotatable frame 95, having a flange 96 connected with and driven by the hub of motor 94. The rotatable frame 95 has anti-friction rollers or the like 97 conveniently located so as to bear against and be guided upon the ring 87. The lower portion of the shaft 93 carries a multiplicity of contact rings to which wires (not shown) extend from the motors of the finder. The rings are grouped as 98, and arranged for rotative movement relative to a multiplicity of fixed brushes or wipers arranged to conduct current to the respective contact rings and of which three are shown as 100, 101, 102, mounted on the insulating bushing 91. The lower end of the shaft 93 is engaged by a flange 103 mounted on the casing of a motor 104, the hub of which carries the enclosed casing 105, containing the compass unit to be described.

The rotatable frame 95, driven about a normally vertical axis by the motor 94, has a pair of upstanding arms 116, diametrically spaced, having bearings 117, for the support of a substantially rectangular cradle 118 on an axis analogous to axis 214 of Fig. 21. The upstanding arms carry rigidly the fixed drums 120, concentric with the axis of the bearings 117. A motor 121 is mounted on one side of the rectangular frame, as by a recessed bracket 122, and upon the hub thereof there is mounted a drum 119. The spindle of the motor 121 forms a bearing or journal for a gudgeon mounted on the outer wall of the finding tube 65. A motor 123 is mounted on the opposite side of the cradle 118 from motor 121, and its hub engages the side of tube 65 diametrically opposite to the gudgeon and by its operation causes the tube to swing on a transverse diametric axis. On the same side of the cradle as motor 121, and at each end there is a resilient arm 124, carrying a spindle 125, at each end of which there is an idler pulley 126. A cable 127, engaged about the drum 119 of the motor 121, passes over the idlers 126 at each end and over and in anchored engagement with the respective drums 120. It will be understood that the cable is crossed at one end so that motion of the motor 121, causes the cable to be tightened in one direction and slackened in the other on both drums 120 in the same direction, and, the drums being fixed to the arms, will cause the cradle or frame to oscillate on its pivots 117, thus inclining the tube 65 about an axis longitudinal of the cradle. The action of motors 121 and 123 will therefore move the tube 65 universally in its quest of the sun or other source of radiant energy and will be individually actuated so as to point the tube at the sun or such source.

Mention should be made at this time of the correction for declination as it will be embodied according to an illustrative form. Reference may be made to Figs. 1a and 2. As the structure shown in the figures and to be associated with the figures may be and is preferably identical with that already described in connection with Fig. 21, the same reference characters will be applied as are used in connection with other figures. The general nature and functioning will of course be clear from what has gone before relative to Fig. 21. The substantially rectangular cradle 118, mounted pivotally on an axis 214 normally maintained in the true east-west line, as will later appear, and driven to oscillation about that axis through cables 127 driven by motor 121, controlled by the same photo-electric devices 69 and 70 as described relative to Figs. 1 and 2, has trunnions or other bearing devices defining a longitude axis 211, upon which a secondary ring 395 is journalled in driven relation to motor 123, as in the other forms this motor is controlled by photo-electric devices 76 and 81. The finder tube 65 containing photo-electric devices is journalled on trunnions or bearings on ring 395 defining the declination axis 314. One form of simple harmonic motion that may be utilized is shown in Fig. 1a. A yoke having legs 319 is mounted rigidly on tube 65, symmetrical of axis 314 with the legs substantially parallel to the axis of the finder tube. A cam or eccentric 317 rotatable on axis 318 is in driven relation to a time controlled motor or clock 320 mounted on ring 395, and is disposed within and in contact with both of the arms 319 of the yoke. The cam 317 is arranged for actuation by the motor 320 by making one rotation in a sidereal year, and is so disposed with the yoke as to cause tilting of tube 65 on axis 314 relative to ring 395, from 23°27' on one side of the perpendicular or mid-position, through mid-position or position of perpendicularity relative to ring 395, to 23°27' on the other side of such mid-position in simple harmonic motion, paralleling the declination of the sun. Preferably, accuracy is enhanced by positioning cam 317 as far as possible from axis 314. Obviously any other means for correcting declination by simple harmonic movement of finder tube 65 can be used, as by the pitman and crank of Fig. 21.

The compass unit of the instrument is preferably mounted in the housing 105, although positioning at a remote point relative to the finder unit is contemplated. This comprises preferably, a spindle 128, carrying a float 130, disposed in a well 131 arranged to receive mercury to float the spindle. The well is so arranged as to preclude spilling the mercury even if the compass unit is turned upside down. The upper end of the spindle is guided by a fixed bearing 132. The compass needle 133 is composed preferably of a plurality of laminations. To the lower portion of the needle 133, by means of an insulating washer 134, there is supported a contact arm 135, the ends of which are arranged alternately to engage the relative fixed contact 136 or 137 in accordance with the direction of the response of the needle 133 to the terrestrial lines of force. The current flowing through these contacts is of the order of milliamperes and all wires conducting the current are twisted together to neutralize the field. Obviously this weak circuit is suitably amplified, as by a milliammeter relay. The sole purpose of motor 104 is to compensate for deviation or variation in the magnetic field. It is controlled from the instrument board to be described. The purpose of the compass unit, whether in the form disclosed or in any other desired form or type, is to actuate motor 94 in one direction or the other so as to move the rectangular frame 118 in azimuth until its axis, longitudinally, lies due east and west geographically. The contacts 136 and 137 are so disposed relative to the needle 133 as to cause this result. The position of the finder tube cradle or framework in Fig. 1 is assumed to be as it might be before motor 94 has been actuated to swing the cradle.

It is important that some means be provided for orienting the finder unit so that the axis 214 is caused to lie in the true east-west direction. A convenient mechanism for the result is the motor 94, which is the orienting motor. While a magnetic compass has been described as a means for securing this orientation, it is recognized that any other sort of direction indicator may be used for actuating the motor 94, including earth-inductor compasses as well as gyro-compasses and the like. There is still a further development in true direction indicators that may be preferred for use with this navigating instrument, of which mention should be made. This is the sun compass forming the subject matter of my application for patent Ser. No. 734,057, filed July 6, 1934.

As recited in that application the radiation of the sun is caused to form a positive or negative beam of radiant energy by projection through or relative to an element pointing in predetermined angular relation to the sun. The beam is caused to impinge between two photo-electric devices such that when they are each equally illuminated, the circuits which they control are balanced and the motor for orienting the element is inactive, and an axis of the element is then in predetermined relation to true north and to the meridians. As the element departs from such predetermined relationship to the true direction, the beam is shifted so as to unbalance the photo-electric circuits, to actuate the orienting motor to reestablish the predetermined relation. It will be clear that this system is easily applicable to the navigating instrument herein.

Referring to Fig. 17a, there is disclosed a wiring diagram of a form of sun compass according to that application, shown as operative relative to the orienting motor 94 of the instant disclosure.

A photo-electric cell 376 has its cathode coupled with the anode of photo-electric cell 381, and to the grid of an amplifying tube 419. The cathode of cell 381 is connected to the negative of a battery or power source 420, while the anode of cell 376 is connected to some positive voltage higher than the voltage of the cathode of the amplifying tube 419. Relay 415 is connected between the plate of tube 419 and the positive terminal of battery 420. Potentiometer 421 and resistor 422 provide a drop in potential at various points, therefore shifting the center tap of potentiometer 421 changes the potential of the grid in the amplifying tube, thus providing a means for controlling the amount of current flowing through relay 415, and therefore a means for actuating relay 415 due to any change in the light intensity differentiating on cells 376 and 381. As shown in Fig. 17a, relay 415 has leads 424 and 425 leading to the respective fields of motor 94, with the lead 426 common to both circuits.

It will be understood that the mechanism of Fig. 17a may be independent and that the orientation of motor 94 will be accompanied by the orientation of the device causing orientation of both to assume the desired predetermined relationship to true north, by which the light intensity on both cells will be balanced.

It is preferred for most cases that the sun compass be an integral part of the navigating instrument, and for this purpose some such device as shown in Fig. 17B may be used. In this device mechanical integration is resorted to to secure proper tilting and aiming of the finder tube and also orientation of same for positioning with the proper axis on the east-west line, from the same photo-electric cells. Using the same wiring system shown in Fig. 17a, with cells 76 and 81 of the finder tube system in the circuit, and with the same relay 415, and connections therefrom 424, 425 and 426, a continuously driven motor relay 427, has the incomplete peripheral arcuate contact 430, constantly in circuit with common lead 426, and has two leads 432 and 431, leading respectively to the common terminal of motor 94 and the common terminal of relay 231, of Fig. 17. Connectors 424 and 425 lead respectively to the appropriate coils of relay 231, and the proper field coils of motor 94. The rotary relay will be driven at the speed desired, and it will be seen that alternatively the same photo-electric cells 76 and 81 are coupled with the relay 231 in the navigating instrument assembly so as to control the tilting of the finder tube on longitude axis 211, and with the motor 94 to orient the finder tube assembly in azimuth to maintain the proper east-west disposition of the axis 214. Any other form of mechanical integration may be resorted to to secure this desirable result.

In further exposition of the sun compass operation it might be observed at this point that the principle underlying its use is that as the sun relatively travels in a day from east to west, it is traveling in a substantial plane perpendicular to the earth's axis. If the sun pointer or finder tube is pointed at the sun to turn on an axis parallel to the earth's axis (true north and south), and is caused to rotate on that axis to follow the sun, during the passage of time, then except for the instant of high noon with the sun exactly at the zenith, the sun's beams will be symmetrical in the finder tube only so long as the said instrument axis remains parallel with the earth's axis. Deviation from true north, therefore, results in unbalance of the photoelectric cells coupled in the pair through a symmetry of the beam in the finder. Unbalance of the photo-electric circuits eventually causes proper actuation of motor 94, or its equivalent, so as to orient the assembly to urge the telescope or finder toward such proper disposition in azimuth as will cause the light or energy beam again to become symmetrical of the finder tube as an incident of proper east and west positioning. It is believed this will be clear.

Referring now (Fig. 9) to the instrument panel or dial board 140, it will preferably comprise four sets of dials and a clock. The arrangement is, of course, purely arbitrary. In the upper left corner is the course indicator 141, having a vertical center or hair line, which comprises a large dial 142, a small dial 143, and a movable pointer 144. The actuating mechanism will be described later but it may be noted that when the hair line 145 of the pointer is directly on the vertical center line the vessel or craft is on its proper course and deviation from the proper course is indicated by movement of the pointer 144 relative to the hair line of the instrument 141.

In the upper center of the figure there is shown a distance instrument 146, comprised of a large dial 147 and a smaller dial 148 previously described in connection with Figs. 4 and 5.

At the lower left of the instrument panel is the longitude indicator or instrument 150. This comprises four concentric dials, of which the upper halves only are revealed. The largest, 151, indicates the degrees of longitude of the objective, the next, 152, the minutes of longitude of objective, the next, 153, the minutes of longitude of position, and the smallest, 154, the degrees of longitude of position.

At the lower right of the panel there is shown a latitude instrument or indicator 155, having four concentric dials, respectively 156, 157, 158 and 160, and respectively indicating degrees of latitude of the objective, the minutes of latitude of the objective, the minutes of the latitude of position and the degrees of latitude of position.

At some part of the instrument board there will be a clock 161, which is an electric clock, giving or controlling electrical pulsations at certain predetermined intervals.

On some part of the panel there will be arranged a series of two circuit switches, respectively 162, 163, 164, 165, 166, 167, 168 and 170.

An illustrative motor assembly controlling the course indicator 141 is shown in Fig. 10. Referring now to this figure, it will be observed that a casing 171 is provided, to the rear wall of which a fixed motor 172 is attached. This motor is in synchronism with the motor 104 in the compass unit and is adjusted for variations in magnetism and deviations in the compass if a terrestrial magnetic device is used for orientation. With the sun compass alternatively proposed this motor 172 with its function may be eliminated. The hub of the motor 172 engages a flange 173, mounted on the casing of a motor 174. With a gyro compass or sun compass, motor 174 will be mounted directly on casing 171. The hub of motor 174 engages a flange 175 on the casing of a motor 176. A tubular spindle 177 extends from in front of the motor 176, through its tubular axis, and through the tubular axis of the motor 174, and is engaged and carried by the casing of motor 174. The spindle carries at its forward end the small dial 143 of the course instrument 141. It will be observed that this dial is turned directly by motor 172, through its driving engagement with motor 174 carrying the spindle 177. The hub of motor 176 carries the pointer 144, and the casing of motor 176 carries the dial 142. It will be observed that either motor 172 or 174 may move the casing of motor 176 and thus the dial 142. All three motors can function to move the pointer 144, and its position therefore is a resultant of the movement of all three.

The distance dial 146 is illustrated as regards its motor mounting by the views of the specimen motor shown in Figs. 4 and 5, and it will be observed that motor 10 will have dial 147 mounted on the hub and graduated in degrees while dial 148 is mounted on the spindle and graduated in fractions of degrees.

Referring to Fig. 11 there is disclosed the operating mechanism for the longitude indicator. This comprises a motor 178 and a motor 180, arranged in juxtaposition and each carrying a pair of dials. Thus motor 178 carries, on its hub, dial 151, indicating the degrees of longitude of objective and on its spindle and movable, of course, at a predetermined greater rate of speed, the dial 152 indicating the minutes of longitude of the objective. Motor 180 carries on its spindle the dial 153, and on its hub the dial 154.

Similarly, for the latitude indicator (Fig. 12), there is provided a pair of juxtaposed motors, as 181 and 182. Motor 181 carries dial 160 on its hub and 158 on its spindle, motor 182 carries dial 157 on its spindle and dial 156 on its hub.

Obviously one of each pair of motors 180 and 178, and 181 and 182, will have its magnets reversed so that the dials will turn in the same directions even though the motors are in reversed positions as shown.

It will be understood that any desired sort of interrupter can be used, as any device that will more or less rapidly make and break a circuit may be used. I show such a mechanism, for purely illustrative purposes in Fig. 14. This may comprise a coil 183, a rocker bar 184 carrying three resilient movable contacts, respectively 185, 186 and 187, and three fixed contacts, respectively 191, 192 and 193, and a spring 188 normally pulling the bar down on its pivot 190 against the urge of the core of coil 183. Preferably there is a primary circuit through coil 183, contact 191 and contact 185. Two secondary circuits have a common ground on the frame and alternately are closed through 187 and 193, and then through 186 and 192.

It will be preferred that the interrupter be of fairly high speed so as to make and break a circuit with appreciable rapidity so as to facilitate the initial setting of the instrument.

The clock 161 may be any sort of instrument and make momentary circuits at any desired intervals with each circuit of a desired, usually short, duration. For purposes of this discussion it will be assumed to be a clock that electrically winds itself every fifteen seconds. Any other time element could be used so long as it was properly coordinated with the follow-up motors, but such a clock is now commercially available. The fifteen second interval has been calculated in connection with the predetermination of the number of teeth on the respective gears in the motors. Remembering that owing to the gear ratio of the motors it requires 5760 electrical pulsations to move the hub of a motor through a single rotation, it might be noted that there are exactly 5760 fifteen second intervals in one day of twenty-four hours.

It will be understood that there will be interlocking relays of any desired sort to prevent any motor from simultaneously receiving current in both magnets, and that there will be provided such desired sorts of electrical energy sources, batteries, connectors, audio tubes and the like as may be necessary to connect the several instrumentalities.

It will be understood that if the craft in which the instrument is disposed is turned in such a manner that the compass needle 133, if such compass or its equivalent is used, swings so as to establish a milliampere circuit through either stationary contact 136 or 137, and with the compass contact 135 in the circuit as by its electrical engagement with the mercury pool, which may form the terminal for a common ground for either circuit, an appropriate milliammeter relay is closed in a circuit through a pulsator or interrupter and through the appropriate magnet of motor 94, and through the synchronized motor 176 of the course indicator.

Actuation of motor 94 obviously swings the rectangular cradle or frame 118 in azimuth until it lies in the magnetic east and west line. As the instrument is arranged for operation relative to geographical north and south, the operator determines from an appropriate chart, the deviation of the magnetic compass from the geographic north. In the light of this information, by operating the proper switch of the battery of switches, a circuit is closed through a pulsator, and through the instrument. By watching the dial 143 the duration of the establishment of this circuit is easily determined. Actuation of motor 104 swings the compass housing relative to the rectangular frame a degree sufficient to compensate for this deviation. Obviously this has through the actuation of motor 172 in the course instrument, turned motors 174 and 176 through the same degree, and obviously changed the position of the dial 142 as well as of pointer 144. Obviously also the relative movement of the compass housing and the rectangular frame has caused the compass needle to swing to such a degree as to close the proper circuit through motor 94 to cause the rectangular frame (and the compass housing with it) to lie in a line passing through the geographical east and west points. This again is characterized by a synchronized motion of motor 176, which swings the pointer 144. The degree through which the pointer is off-set from the hair line of the course instrument 141 is an indication of the degree through which the craft must be turned to be on the proper course. Obviously the setting of the pointer in this instance is a resultant of the motions of motors 172 and 176. Fluctuation of the craft relative to the course closes the circuit through either contact 136 or 137, swings the rectangular frame by actuating motor 94, and also swings the pointer 144 by actuating motor 176. If the operator returns the craft to the proper course it will be manifest by the pointer returning to registration with the center line of the course dial of instrument. Obviously such return to the course is accompanied by the closing of the opposite milliampere circuit through a compass contact, and the energization of the opposite magnet of motors 94 and 176. The motor 94 returning the rectangular frame to the position in the east and west lines, and the motor 176 actuating the pointer 144. Obviously with a gyro or sun compass as disclosed, all actuations incident to compass deviations are eliminated.

It will be clear that any desired means (not shown) may be associated operatively with the motor 176 or the pointer 144 to steer or otherwise control the position of the craft.

With the rectangular frame 118 thus disposed in the geographical east and west line the finder may be so disposed as to point at the sun, that is, the finder 65 is positioned on axis 314 in accordance with declination as by motor 320, or manually, motor 123 is actuated to swing the tube on its transverse diametric axis 211 and motor 121 is actuated to swing the tube on the axis 214 longitudinal of the rectangular frame or cradle until the radiant energy of the sun is exactly longitudinal of the finder tube. This is done by establishing the circuits through the photo-electric cells, the amplifying system, and the respective motors 121 and 123, which at the time of setting are disconnected from the other motors and which circuits are effective upon energization of the appropriate photo-electric cells.

If the craft remains stationary so that there is no change of position, and if the sun is assumed to make one complete revolution in twenty-four hours, then through the energization of the circuits through the appropriate photo-electric cells each time the finder is slightly off-set from the center of the sun, it will be found that the number of pulsations effecting movement of motor 123 in its movement to move the tube to follow the sun will be 5760 in the course of twenty-four hours, or in that relation for shorter intervals, following the assumption of clock controlled electric pulsations every fifteen seconds. At the time of setting the instrument the circuit is closed through the photo-electric cells, the amplifying units, and the respective motors 121 and 123, but motor 123 is disconnected from the circuits through the normally synchronized motors 47 of the resolving unit, and motor 180 of the longitude indicator dials, and motor 121 is disconnected from its normally synchronized motor 33 in the resolving unit and motor 181 for the latitude indicator dials 158 and 160. No matter what the position of the sun in the sky, during the daylight hours at which the setting of the instrument is made, the tube is so arranged that the sun's rays energize the proper photo-electric cells to actuate motors 121 and 123 to a degree sufficient to point the tube directly at the sun. Thus, when the finder unit is shut down on a flight at sun down, as is advisable in one form of the invention disclosed, and the flight continues during the night, if the unit is energized at dawn, the tube will be caused to travel across the heavens to pick up the sun. The instrument is arranged such that by operating the appropriate switches auxiliary pulsating circuits can be closed through the appropriate magnet of both motors 121 and 123, so that if necessary or desirable, owing to the extreme angularity of the tube to the sun's rays when the photo-electric circuit would be ineffective, the tube may be swung to a position approximately aimed at the sun or until the automatic circuits through the photo-electric cells begin to function to complete the pointing operation. From this point, of course, the pilot's pulsating circuit will be disrupted and the automatic photo-electric circuits will carry on. If nothing else in the instrument is energized, then the tube will continue to follow the sun. The instrument can be a continuously actuated unit, in which event the motor 123 will be continuously actuated by a clock mechanism so as to cause the tube to continue to follow the sun even after it has sunk below the horizon, as has been described in connection with the fifth photo-electric cell, but for the present purposes it is assumed that the finder unit is effective only during the daylight hours, and is necessary to reset the instrument in the morning after the darkness has passed, aside from such manual setting at night as may take place as later described.

Motor 47 in the resolving unit has a magnet in the circuit with a magnet in motor 123, so that each pulsation energizing motor 123 also actuates motor 47 in a given direction. Clock 161 is in the circuit with the other magnet of motor 47. If during an interval of craft immobility the two circuits are each effective on motor 47 it will be clear that each impulse from motor 123 has been cancelled by an opposite impulse from clock 161, and motor 47 will remain stationary; this despite the fact that motor 123 has been actuated so as to follow the sun. Movement of the craft carrying the instrument, and therefore movement of the instrument, represents not only movement relative to the earth but also movement relative to the sun, whether moving with the sun or away from same. Obviously if the instrument is moving in the same direction as the sun its sun finder movement is slower than where it is remaining stationary and appreciably slower than if it were moving away from the sun. The differential between the movement of the finder unit when the craft is stationary and the movement of the finder when the craft is in movement is an index of the movement of the craft and therefore of the instrument relative to the earth. If motor 47 therefore has received in a given interval a greater number of pulsations from the finder unit motor 123 than it has from the clock 161, or a smaller number, the consequent resultant movement of the motor 47 represents angularly the movement of the craft in the given interval. This, owing to the theoretical line of movement of the sun about the earth (assumed for the purposes of the instrument) represents the movement in longitude.

Somewhat similarly the motor 121 actuates motor 33 to represent the latitude of the movement of the craft. In explanation of this, and as explained in the theory, it will be understood that except when the craft is directly upon the Equator the sun does not lie in a plane defined by the east, the west and the zenith. Therefore owing to the pendular gimbal suspension of the finder unit, if the tube were vertically aligned therewith, it would never point at the sun, therefore the number of degrees through which the rectangular frame or cradle 118 must be turned about the east-west axis from the zenith plane represents the latitude of position of the craft. (Leaving aside for this purpose any consideration of the declination of the sun, as this has been obviated by the angular positioning of the tube on declination axis 314.)

It is contemplated that owing to the relative instability of the craft and a consequent movement of the craft in various directions and about various axial points, there may be intervals in which the craft will cause the finder tube to overshoot the sun, or other radiant source, in doing which it may move the tube on either side of a mean average position, for instance as incident to rolling and pitching moments. Under such conditions of course motors 121 and 123, respectively, will be actuated in accordance with the direction of the movement and in accordance with the period of pulsations passing through them, and which will be indicated by a given number of pulsations on motors 47 and 33, in one direction respectively, but which is followed by a recession which energizes motors 121 and 123 respectively in substantially the same degree in the opposite direction. Obviously such recession movement similarly actuates the respective motors 47 and 33 in the opposite directions, so that their ultimate position is a resultant of the opposite and mutually cancelling series of pulsations.

As a matter of explanation, to completely understand this action, it must be realized that the device determines instant position and has no connection with a basic position or starting point, as has, for example, the water log of a vessel whose indication is dependent upon the point of start. This device is continuously integrating for its position so that the errors of minutes past are not accumulated. Thus, if it be assumed that through prolonged turning movements, or through prolonged periods of acceleration or deceleration, the pendular suspension has been angularly inclined away from the horizontal so that the finder has been adjusted on its axes to point at the sun, thus incurring a merely instantaneous error in the reading of longitude or latitude, or both, these motions ultimately come to an end, again making the pendular suspension seek a true horizon, which action makes the finder tube deviate from pointing to the sun, which results in actuation of the correcting medium and results in indication of true latitude and longitude, and, of course, the wiping out of all past errors, and which thus obviates the accumulation of errors incurred at prior moments. This functioning is facilitated by the provision of the pulsating circuits described.

It will be understood that the provision of the motors and dials on the instrument board is simply a matter of convenience as the dials or their equivalent might easily be mounted directly upon the respective motors in the resolving unit.

An interesting feature of the motor and dial assembly may be pointed out in connection with the matter of the setting of the dials. Remembering that the spindle of a motor rotates seventy-two times as fast as the hub of the motor, and with a motor of any instrument dial in mind, it will be apparent that the dial on the hub graduated in degrees, turns relatively slowly compared with the dial on the spindle graduated in minutes. Thus, in the matter of actuating motor 33 in the resolving unit in accordance with the latitude of position, the operator closes the proper switch to establish a pulsating circuit through the appropriate magnets of motors 33, in the resolving unit, and the coordinated magnet in the motor 181 of the instrument panel. As dials 158 and 160 are in view of the operator, the rather rapid movement of the "minute" dial 158 functions as a vernier by which to set the "degree" dial 160 with accuracy. The motor and dial assembly thus is one enabling rapid and accurate positioning of the motors. Obviously if the setting of the dial should not be concluded promptly enough so that it over-shoots, so to speak, the switch is thrown in the other direction to reverse both synchronized motors to return the dials to the proper setting.

With the finding mechanism described having universal motion it will be obvious that one can swing it about its center in such manner as to point at the sun, and that the dials associated therewith will indicate the latitude and longitude of the position, as noted, and would moreover continue to indicate the position in terms of latitude and longitude as the position is changed. In the resolving unit the position of the finder tube is responded to by motor 47, responsive to the longitude of position as well as to the setting for the longitude of the objective, and by motor 33 responsive to the latitude of position, and which is indicated on the proper dials of the instrument. Knowing the latitude and longitude of the objective, for instance Los Angeles, the motor 47 is actuated in the other direction in accordance with the longitude of Los Angeles (as it is only necessary to know the difference in longitudes), while motor 45 is actuated in accordance with the latitude of the objective, Los Angeles, this is accomplished by the pilot by simply closing the proper switch to send a pulsating circuit through motors 47 and motor 178 until the longitude of Los Angeles is indicated by the dials 151 and 152; then by closing the proper switch to send pulsations through motor 45 and motor 181 until the dials 156 and 157 indicate the latitude setting for the objective.

Assuming that the universal center of the resolving unit, located at the intersection of the axes 29 and 39 represents the center of the earth, and that the axis of the yoke 37 represents the line from the starting point or any position en route to the center of the earth, and that the axis of yoke 42 represents the line from the objective to the center of the earth, and, as the disposition of the yoke 37 is variable about the universal center to accord with the latitude of the starting point, and as the angular disposition of the yoke 42 is universally variable or adjustable about the universal center in accordance with the latitude of the objective and the differences in longitude between the starting point or any position en route and the objective, it will be seen that one has mechanically presented on a minute scale the problem in spherical trigonometry necessary to plot a course and to attempt to derive by mathematics the resolution of the triangle presented, but the invention obviates the necessity for navigating or mathematical calculation on the part of the observer. Referring to Fig. 6 and with reference to the balanced neutral position of the parts which are disposed so that there is no angle between them, and thus the starting point and the objective are the same, it will be observed that the theoretical axes of both yokes 37 and 42 are coincident and motor 38 is at zero and motor 36 is at any position as their associated motors respectively 10 and 174. This is prior to setting the instrument.

Movement of motor 47 through movement of the bracket 46 bodily moves motor 45 and its associated bracket arm 43 to an extent sufficient to move the yoke 42 so that it is angularly disposed relative to the yoke 37. This is one factor in the setting of the instrument, as to the longitude of the starting point (and later during all new positions of the craft relative to the surface of the earth), and the latitudes of the starting point and objective, respectively determined by actuation of motors 33 and 181, and of motors 45 and 182 also affect the problem. The setting of motor 33 for the latitude of position swings bracket arm 34 and the motor 36 and yoke 37 carried thereby, vertically about a horizontal axis, (passing through the universal center of the resolving mechanism). Motor 33 and the associated synchronized motor 181 are synchronized with motor 121 of the finder unit, so that they are all actuated in the same direction and to the same degree after the initial setting of the respective motors for the starting latitude. This setting also effects a further change in the angular relation of yoke 37 to the yoke 42, as will be obvious. As the latitude of the objective is a fixed condition, the actuation of motor 45 to swing bracket arm 43 vertically on a horizontal axis (also passing through the universal center with its rotatably supported yoke 42), and the synchronized actuation of motor 182 actuating the dials indicative of the latitude of objective ceases after the initial setting, and the positions remain constant during the trip. Obviously such arcuate movement of bracket arm 43 has still further changed the angular disposition of the respective yokes 37 and 42. At this time, and before any further change has occurred in the unit, the axes of the two yokes represent the true angularity of the lines from the position to the center of the earth, and from the objective to the center of the earth. If one can imagine a plane extending through the axis of the earth, i. e., through the geographical north and south and passing through the point representing the position (in this case the starting point), then the angle between the last mentioned plane and the plane defined by the instant position, center of the earth and the objective is an index of the course from the instant position to the objective. As the axis of the yoke 37 lies in a plane extending through the geographical north and south (at least theoretically in its relation to the position of the remainder of the resolving unit, as it need only be a fixed item as regards the remainder of the unit, and as this axis is not changed in the actuation of the resolving mechanism except in the same initial plane), if one could determine the angle between the plane of the meridian passing through one's starting point (the plane of the axis of the yoke 37), and the great circle of arc drawn between the starting point and the objective (represented by the plane comprised of the starting point, the center of the earth and the objective), then this angle would give one his course at the start toward the objective, and if the elements in the resolving unit representing the position changed constantly to accord with the true position, then the determination of this angle constantly would continue to give one his course toward the objective.

Inasmuch as variations in longitude simply swing the bracket arm 43 about a vertical pivot, and as the yoke 42 is carried thereby, it will be observed that movement of the motor 47 swings the motor 38 about its axis in the yoke 37. However, movement of the motor 45 to swing the bracket arm in accordance with the latitude of the objective presents a change in the angle between the theoretical axes of the yokes 37 and 42, which angle if measured would enable the operator to determine the distance to the objective. As the yoke 42 moves, therefore, it exerts vertical pull on the spring 54 connected to the double contact 53, swinging the said contact into engagement with either contact 51 or 52. This contact energizes the motor 38 in the opposite direction from the pressure of the contacts, and such movement of the motor causes the hub carrying the insulating disc 50 to rotate to a point at which the established contact is broken and the double contact is out of engagement with either fixed contact 51 or 52. As noted, movement of the motor 38 effects synchronized movement of the motor 10 of the distance unit on the instrument dial. At the same time that the yoke 42 has been swung vertically of the horizontal axis, and the arm 55 has been moved closer to the pulley 57 thus shortening the cable length between pulleys 56 and 57, there has been compensation for this by the movement of the arm 61 with the disc 50, so as to take up the cable at the bottom. It will be clear that any further relative movement of the yoke 42 and the motor disc 50 will cause further energization of the motor 38 and of the synchronized motor 10. Of course a similar result is obtained by any movement of the bracket arm 34 in response to the actuation of motor 33.

It will be observed that motor 36 and the yoke 42 are both mounted for free anti-friction rotation. Movement of yoke 42 to a position in which its theoretical axis is angularly divergent from the theoretical axis of yoke 37, presents a situation in which the upper end of arm 55 and pulley 57 have been relatively moved out of alignment with the axis of motor 36, so that the pull of the cable is eccentric to that axis. As the motor 36 is freely pivoted such eccentric pull urges the motor 36 to rotate upon its axis. As the motor 36 carries the insulating disc 5, the disc is moved with the motor 36 concentrically of its axis until the relatively fixed double contact 8 is abutted by either stationary contact 6 or 7, according to the direction of the rotative movement. Such contact permits the pulsating energization of motor 36 in an opposite direction so that the motor, carrying yoke 37, rotates through such a degree as moves the insulating disc out of engagement with the double contact 8, and the motor 36 stops. As the degree of rotation of motor 36 is a function of the angle between the theoretical axes of the yokes 37 and 42, its measurement is a function of the course. The movement of motor 36 is synchronized with the movement of motor 174 on the instrument panel. As yoke 42 is freely pivoted on the bracket arm 43, and as motor 38 is freely pivoted on both yoke 42 and yoke 37, motor 38 assumes any position necessary during the movement of motor 36. The movement of both motors 33 and 38 continues until such time as the arm 55, pulley 56 on arm 55, and pulley 57 lie in a plane passing through the intersection of the theoretical axes of the yokes 37 and 42 in the center of the axis (39) of the motor 38 and in which plane the theoretical axes of yokes 37 and 42 also lie.

It will be understood that suitable counter-weights 194 will be provided to balance the brackets and arms of the resolving unit.

It should be noted that the indicated course of the instrument is not necessarily the course from the starting point to the objective after the movement has begun, but is always the course from the instant position toward the objective, regardless of the amount of drift or where it occurs. Thus on the course from New York to Los Angeles, the course at the instant of starting is from New York, but thereafter it is a course from wherever the craft may be between New York and Los Angeles, whether on the original course or not.

A possibility of error in the response of the finder unit to the true location of the sun may arise from failure to appreciate the factor of the refraction of light and to compensate therefor in some manner. The refraction index varies from a minimum at noon to its greatest amplitude when the sun is close to the horizon. This obviously may be compensated for in other ways, but it is preferred to utilize the semi-spherical dome 89 of the finder unit. This dome is of transparent or translucent material capable of transmitting the infra-red rays (and as previously noted the photoelectric cells are also responsive to the infra-red rays in order to be actuated during stormy or cloudy weather), and its center is below the center of oscillation of the finder tube. The relation of the dome to the finder tube is such as to cause a refraction of the rays passing therethrough which varies according to the angle at which they are incident upon the dome. Thus, when the refraction of the sun's rays by the atmosphere is substantially zero, the refraction of the dome is also zero as when the tube points substantially vertically of the dome. As the refraction index of the light increases from the relative angular movement of the sun and the dome, so also does the refraction index of the dome increase to compensate for the atmospheric refraction so that the rays passing through the dome are incident upon the finder tube at the same angle, substantially, as the rays actually emanate from the sun.

The instrument as disclosed in the drawings is designed for use in aircraft and the illustrative form of the invention is not supposed to be a continuously used instrument, in the sense that it runs from year to year. As noted it can be caused to run continuously, by having the finder unit continuously driven alternating between automatic and time controlled driving. In the relatively short trips of aircraft it will be understood that during daylight the finder unit will continuously indicate the true position. At night, in the form of invention shown, it may cease to function to continuously indicate the true position and preferably will be disconnected at the approach of night either automatically or manually. Thereafter the course indicated on the course dial in the absence of movement of the finder unit will be the course from the last adjusted position of the motors responsive to the latitude and longitude of position, respectively, and not from the instant position. During the night therefore a possible procedure for the pilot is to determine land-marks, the position of which he knows. Upon arrival at such a mark, the proper latitude and longitude for that land-mark will be impressed upon the appropriate motors and dials for the position. Immediately the course indicator will indicate the course from the new position to the objective, and, of course, the distance indicator will also have been actuated by the resolving unit to indicate the distance from the objective. This will be repeated from time to time, and each time the new course to the objective will automatically be set. For certain purposes therefore the instrument without the finder unit would have decided utility, inasmuch as it automatically indicates a course from any position for which it is set to any objective for which it is set, and continuously indicates such course as the instrument is manually manipulated in accordance with changes of position. Similarly the finder unit is of value for its determination and continuous indication of the instant position, without necessarily being associated with the resolving unit.

A brief explanation of the wiring diagrams should suffice to make them clear. It will be seen that the diagrams of Figs. 16 and 17 are very similar, although the disclosure of Fig. 16 is complete without the fifth photo-electric cell rendering the device of continuous operation, and which latter cell with its associated elements is disclosed in Fig. 17.

Referring now to both Figs. 16 and 17, at the left side will be found an amplifying circuit which is for the purpose of magnifying effects obtained from the photo-electric cells 76, 81, 79 and 69. Magnification is by reason of one stage audio amplification. The actuated elements are milliammeter relays 230 and 231.

The coils of relay 230 are respectively energized by cells 69 and 79 which are affected by light due to lateral movement of the sun's rays coming through the finder tube. The coils of relay 231 are respectively energized by cells 76 and 81, which are affected by light due to transverse movement of the sun's rays coming through the finder tube.

The secondary circuit of relay 230 contains the coils of motor 121, and actuates motor 121 by reason of a pulsating circuit which passes through the line when relay 230 is actuated. Similarly relay 231 causes motor 123 to be actuated by a similar pulsating circuit, either in one direction or another, depending upon which direction the sun's rays travel transversely of the finder tube.

In Fig. 17, there is an additional relay 232, which selects a secondary circuit depending upon whether cell 88 shows a change of resistance due to the disposition of light on its sensitive surface or not.

The various photo-electric cells respectively are shunted between the plate and grid of an audio amplifying tube of a battery of tubes 233. Suitable resistances in series with a polarizing voltage are placed between the grid and negative filament. The particular filament of the tubes utilized shows ample emission at a pressure of 1½ volts (difference of potential). The above circuit makes it possible to actuate various step-by-step motors as shown on the diagrams either independently or in synchronism with others, as will be pointed out.

In both diagrams, switch 234 admits a difference of potential to the follow-up motors and other actuatable devices through the medium of switches 162 to 170 inclusive, through make and break devices or pulsators 235 and 236 (see Figs. 14 and 15), through lock-in relay 237, etc.

When switch 234 is closed it will be evident that pulsator or interruptor 235 will be in continuous operation. Pulsator 236, on the other hand, will operate only if switch 166 is moved to the left, or the position "set" (as opposed to the position "operate" assumed by moving the switch to the right); at all other times remaining inoperative. A pulsating or periodic current will be delivered from the secondary side of both of the pulsators.

It will be remembered from the theory and what has gone before that certain functions of the device must be continual, such as the disposition of the finder tube axis in an east-west direction, the operation of the distance motors 10 and 38, and course motors 36 and 174, and the electric clock and its associated relay and driven motor 320, they therefore must operate directly from the source of supply without interference from switches, etc., or from the secondary side of the continuously functioning pulsator 235. As will be observed in the diagrams clock 161 is in series with a coil of lock-in relay 237, and the motor 320 (not shown in the diagram) and a constant supply of 22½ volts. Energization of said circuit by reason of the clock rewinding itself (in the particular type of time controlled circuit controller disclosed) causes subsequent energization of the primay coil of relay 237 and energization of the declination motor 320. Likewise motors 36 and 174 are under continuous pulsator control and will operate due to contact made in the mechanical relay 238 (comprised of contacts 6, 7 and 8, Figs. 6 and 8), also motors 38 and 10 are under similar continuous pulsator control and will operate due to contact made in mechanical relay 239 (comprised of contacts 51, 52 and and 53, Figs. 6 and 8), the first couple comprising the course indicating unit, the second couple the distance indicating unit.

It will be noted that compass 240 when this form of orienting device is used, being a constantly functioning device and controlling motors 94 and 176, as described above, is likewise continuously connected with the source of electrical energy and effects its control through the medium of relay 241.

Switches 162 to 170 inclusive, are for the purpose of setting various units of the instrument independently of the normally automatically actuating forces. No effect is caused by any of the switches in the battery of switches other than switch 166, unless pulsator or interrupter 236 is in operation, which can only be accomplished by moving switch 166 to position "set."

With switch 166 in the position "set", actuation of switch 167 causes step-by-step movement of motors 104 and 172, those controlling the compensation for deviation, if necessary by reason of the particular orienting device; actuation of switch 170 causes a step-by-step movement of motors 182 and 45, those indicating the latitude of objective; actuation of switch 168 causes a step-by-step movement of motors 181, 33 and 203 (the latter to be described), those indicating latitude of position; actuation of switch 162 with switch 163 in neutral position causes step-by-step movement of motors 180, 47 and 205 (the latter to be described), those indicating the longitude of position; actuation of switch 162 with switch 163 in closed position causes step-by-step movement of motors 178 and 47, those indicating longitude of objective; actuation of switch 164 causes step-by-step movement of motor 123, that motor which turns the finder tube on its short axis; actuation of switch 165 causes step-by-step movement of motor 121, that motor which turns the finder tube on its long axis (east-west axis).

Movement of switch 166 to position "set" causes energization of coil 242 of cut-out relay 243, thereby disconnecting motor 123, from motors 180, 47 and 205, and motor 121 from motors 181, 203 and 33, and making it possible to independently manipulate the finder tube and the instrument dials.

Movement of switch 166 to position "operate" completes a circuit which has in series coil 244 of cut-out relay 243, the coil of relay 245, and the secondary coil of lock-in relay 237. The result of closing this circuit due to the intermittent energization of clock 161 (by its automatic rewinding every fifteen seconds), results in a similar energization of the circuit just described, to the end that cut-out relay 243 is opened and relay 245 is closed for an instant.

The secondary circuit of relay 245 contains the transition relay 232 (Fig. 17), which is directly controlled by the photo-electric cell 88. If this cell is energized the armature of relay 232 completes the circuit made in relay 245 through one side of motors 180, 205 and 47, and, due to the opening of relay 243, causes them to move with respect to motor 123. Conversely, during periods of de-energization of cell 88, the armature of relay 232 completes the circuit through motor 123, and because of the opening of relay 243 causes movement of motor 123 relative to motors 180, 205 and 47.

If the disclosed circuits are traced it will be found that a difference of potential of 90 volts passes through the coils of the various follow-up motors.

It will be obvious that the finder tube may be so constructed as to be capable of manual "sighting" at an object, whether the radiant energy of the object is sufficient to energize the photo-electric cells or not. Assume for this purpose that any fixed star other than the sun is to be the objective. It may well be capable of having its radiant energy so amplified as to be automatically effective, and this is contemplated in the use of the invention, although not shown in the form of the invention set out herein. However, the stars being well charted, the angle existing between the sun and any such star can easily be determined. As soon, therefore as the source of radiant energy being followed by the finder unit disappears, the finder tube is angularly moved by closing appropriate switches or circuits through the motors 121 and 123, to dispose the tube at an angular relation to the position at which the automatic sighting ceased, equal to the angular relation of the sun and the designated star. This is done without disturbing the setting of the position responsive motors, which remain at the point indicated as the position at the time the automatic functioning of the finder tube ceased. There may thereafter be an interval of time during which the stars are not visible, during which the position devices remain immovable, and the course last indicated may be continued. During this interval the finder tube may be coupled with a time controlled mechanism such for instance as the clock 161 emitting timed pulsations of energy, and actuating motor 123 at the same speed as the speed of rotation of the earth. If the craft containing the instrument were immovable during this interval, after the source of radiant energy disappeared, and the tube were angularly set back the proper number of degrees and minutes as to point at the star even though invisible at the moment, it will be clear that when the designated star appeared the finder tube would be pointing directly at such star. However, as the craft has presumably been following the course and therefore has moved, it will be clear that when the designated star appears the finder tube will be off-set from the star by an angle representing the movement of the craft. Thereafter, the finder tube will be coupled with the position responsive motors in the resolving unit, and instrument panel, and with the motors 121 and 123 in the finder unit, the observer, sighting on the star will then close such switches as will energize motors 121 and 123 to swing the tube to a position aiming at the star, and synchronously therewith the position motors on the resolving unit and in the instrument panel will be actuated to indicate the true position, the resolving unit will function to actuate motors 38 and the distance dials on the instrument panel while motor 36 will be actuated in synchronism with motor 174 to indicate the course from the true position. Thereafter, during the night, in the absence of means for automatically pointing the finder tube at the star, the observer will from time to time sight the tube at the star, each sighting being accompanied by resetting of the remainder of the instrument.

For numerous reasons it would be advisable to make permanent a record of the course of a given vessel in its course from one point to another. With the instrument described this could be done quite economically and expeditiously by having recording instruments synchronized with certain of the motors of the instrument. As shown in Fig. 13, there is provided a driven roller 195, actuated by any timing element desired such as a motor 196. The latter is a mechanical motor, or a follow-up motor driven by the clock 161. A parchment chart 197, or the like, is rolled upon roller 195, and is fed from another roller 198, suitably supported relative to the first mentioned roller.

The paper or parchment sheet may have a median division line to divide the paper into two halves of equal area, or of different areas if desired. A number of lines extend vertically longitudinally of the paper roll, and represent on the left hand side of the division line degrees of latitude, ranging from 90° north to zero to 90° south. Similarly the right hand side is provided with a series of longitudinal lines representing longitude, and marked from 180° east to zero to 180° west. The paper has transverse spaced lines representing any desired time factors in accordance with the time element of the motor 196.

A latitude stylus of any desired sort, whether periodically depressed to make a mark, or a continuously engaged stylus to make a line, such as 200, is mounted on a rack 201, the teeth of which are in mesh with a pinion gear 202 carried by the hub of a motor 203, synchronized with the motor 181 of the latitude of position dial, or motor 33 of the resolving unit, or both. Lateral movement of the stylus 200 makes a progressive line which indicates at the time intervals of the transverse lines, the latitude of position of the craft, at the times noted. Similarly a stylus 204 may be mounted so as to overlie the right hand side of the paper roll, and be actuated across the paper to inscribe the position in longitude. For this purpose a motor 205 is mounted with a cam 206 on the hub, continuously contacting with a roller or the like 207 mounted on the stylus 204. Any other mechanism may be used to connect the motor 204 with the stylus, obviously, but the device illustrated prevents the stylus from running off the paper at the edges for reasons that will be obvious. Motor 205 will be synchronized with motor 180 in the longitude of position dial. It will be clear that with the motor 196 driving the paper record, the latitude stylus will inscribe the position in latitude while the longitude stylus will inscribe the longitude position as they both change in response to the movement of the finder unit and as the chart moves in accordance with a predetermined time factor.

In the instant form of the invention, the finder may locate and point at the sun, and thereafter, before coupling the finder unit with the respective motors of the resolving unit, the motor 47 may be actuated from the instrument board to give the longitude of position, having first been actuated from the instrument board for the longitude of the objective, and motor 33 may be actuated from the instrument board to give the latitude of position (which will also be indicated on the appropriate dials synchronized therewith), and then the finder unit is coupled with the respective motors 47 and 33 to obviate the necessity for any correction for declination of the sun and the equation of time, then thereafter the change of position will be indicated by appropriate movement of the motors 47 and 33, and as such change is continuous it will form a continuous index of the position. No matter when the setting of the instrument during the daytime takes place, it is only necessary to let the finder actuate itself to find the sun, then independently to set the appropriate motors for the longitude and latitude of position, then couple the finder and resolver and the position is constantly indicated without otherwise considering declination and the equation of time. With a discontinuously running instrument it will be understood that actuating or permitting the finder unit to point at the sun will actuate the coupled motors to indicate the instant position each time it occurs. This may continue the showing of a past position despite departure from that position, until the finder again is permitted or actuated to point again at the sun, when the error of reading will be eliminated by actuation of the position motors to accord with movement of the finder unit to properly point.

In constructing the mechanism it will be observed as a feature of importance that every pivoted moving part is preferably evenly balanced by another part. Thus the motors 121 and 123 are so disposed as to balance each other. The arcuate bracket arms are provided with counter balances, in the resolving unit.

It should be noted of the resolving unit that it is a feature thereof to constantly and continuously resolve the spherical triangles existing between the point where the observer may be, the fixed objective, and earth's pole, as the position of the observer changes. Its utility alone from the standpoint for instance of educational purposes, will be manifest.

I claim:

1. In combination, rotatable means positionable to represent a line from a given point on a sphere to the center thereof, rotatable means positionable to represent a line from an objective point on the sphere to the center thereof, a single resilient means operatively associated with both said first mentioned means arranged to rotate both said means until predetermined lines thereof and said resilient means lie in predetermined relation to a plane to indicate a course from one position to the other with relation to a known fixed point on said sphere, said last mentioned means automatically operative to indicate the course from any position between the given point and the objective with relation to the known fixed point on said sphere when the rotatable means is moved to simulate such position.

2. In combination, a position responsive element having an axis, an objective responsive element having an axis, means joining the two elements for relative universal adjustment with their axes intersecting, resilient means operatively associated with each element for automatically resolving the spherical triangle existing between the plane of the two axes and the planes formed by the respective axes and a fixed polar axis universal center and a fixed plane in which lies the axis of one element by rotating each element until both axes and the resilient means lie in a common plane angularly divergent from the said fixed plane.

3. In combination, a motor, a yoke mounted on the motor with its axis coincident with that of the motor, a secondary yoke pivotally and universally connected with the first mentioned yoke, means for supporting and moving the motor and first mentioned yoke about an axis passing through the universal center of the yokes, means for supporting and moving the secondary yoke universally about the universal center, resilient means operatively associated with both yokes and arranged to actuate said motor on its axis to a degree equal to the resolution of the spherical triangle existing between the termination of the axis of the yoke in the motor, the termination of the axis of said secondary yoke, the universal center and a fixed plane containing the axis of the first mentioned yoke and normal to the axis of the yoke supporting means.

4. In an instrument, means positionable about a universal center having an axis to represent a line from a position on the earth to the center of the earth, means positionable about the universal center having an axis to represent a line from an objective on the earth to the center thereof, resolving means operatively associated with both means continuously responsive to the angular relation of the axes to rotate both said first mentioned means to indicate the arc of great circle between the position and the objective, means automatically operative to change the position of the first means to accord with a new position, said resolving means automatically rotating said two first mentioned means and indicating the arc of great circle between the new position and the objective.

5. In a spherical triangle resolving unit, means having an axis and positionable to represent a line from a position on a sphere to the center thereof, said means being mounted for rotation about said axis, objective means having an axis and positionable to represent a line from an objective on a sphere to the center thereof, said objective means being mounted for rotation about its said axis, the respective axes intersecting in a common universal center representing the center of the sphere, an arm mounted radially of the axis of and upon the objective means, an arm mounted radially of the axis of and upon the position means, and resilient means operatively associated with both said arms and exerting tension on both said means, and so arranged as to cause simultaneous rotation of both said first mentioned means until the resilient means and said arms lie in a plane passing through the universal center, and means for measuring the degree of rotation of one of said first mentioned means.

6. In combination a support, a motor having a vertical axis, and carried by the support, a bracket mounted in driven relation on said motor, a secondary motor mounted on the bracket and having a horizontal axis, a bracket arm mounted in driven relation on the secondary motor, a secondary yoke mounted pivotally on the bracket arm and having an axis perpendicular to said last mentioned motor, a third motor mounted on the support with its axis coincident with the axis of the secondary motor, a bracket arm mounted in driven relation on the third motor, a freely rotatable fourth motor mounted on the bracket arm with its axis in a vertical plane containing the axis of the first mentioned motor, a primary yoke on the fourth motor and having a universal connection with the secondary yoke, resilient means operatively associated with the primary and secondary yokes and arranged to cause rotation of the fourth motor in response to adjusting operation of other motors to a degree equal to the resolution of the angle existing between the axes of the two yokes and their universal center, and a vertical plane containing the axis of the first and fourth motors.

7. In combination a support, a motor having a vertical axis, and carried by the support, a bracket mounted in driven relation on said motor, a secondary motor mounted on the bracket and having a horizontal axis, a bracket arm mounted in driven relation on the secondary motor, a secondary yoke mounted pivotally on the bracket arm and having an axis perpendicular to said last mentioned motor, a third motor mounted on the support with its axis coincident with the axis of the secondary motor, a bracket arm mounted in driven relation on the third motor, a freely rotatable fourth motor mounted on the bracket arm with its axis in a vertical plane containing the axis of the first mentioned motor, a primary yoke on the fourth motor and having a universal connection with the secondary yoke, resilient means operatively associated with the primary and secondary yokes and arranged to cause rotation of the fourth motor in response to adjusting operation of other motors to a degree equal to the resolution of the angle existing between the axes of the two yokes and their universal center, and a vertical plane containing the axis of the first and fourth motors, said resilient means constantly effective to rotate the fourth motor as the other motors are actuated to change the angular relation of the axes of said yokes, and means for actuating selectively certain of said other motors.

8. In combination, means positionable in accordance with the position of a craft, and means responsive to the radiant energy of the sun operatively connected with the first mentioned means to continuously operate said means to change the position of the means in accordance with the change of position of the craft.

9. In combination, means responsive to the sun's radiant energy and automatically movable to point at the sun, and means responsive to the automatic movement of the first mentioned means for positioning in accordance with the movement of the first mentioned means for indicating the position of the craft in which the means are located.

10. In combination, means movable in predetermined angular relation to the sun, a light sensitive cell operatively associated with said means in position to be energized by the sun when said means is properly positioned, an electric motor the angular position of which is determinable in accordance with a function of the position of a craft in which it is located, time controlled means establishing an electric circuit through the motor, and means establishing an electric circuit through the motor in response to energization of the light sensitive cell by the sun.

11. In combination, means operable to point at the sun, a time controlled element, means synchronized with the first mentioned means to move in one direction as the first mentioned means is actuated, and said last mentioned means synchronized with the time controlled element for movement in another direction.

12. In combination in a navigating instrument, a support, a finder tube, actuatable devices for swinging the tube in two planes relative to the support, photo-electric elements operatively associated with the tube, means establishing circuits through the respective photo-electric elements and the actuatable devices and so arranged that angularity between the tube and the rays of the sun energize such elements as will increase the strength of the circuits through the appropriate actuatable device as to move the tube until the rays of the sun are parallel with the tube.

13. In combination in a navigation instrument, a horizontal pivoted support, a tube pivotally mounted in the support, a motor operatively connected with the support to swing the support on the horizontal axis, a motor operatively associated with the tube to swing it on its pivot relative to the support, means in the tube responsive to impingement of the sun's rays to selectively energize both said motors, said means so arranged as to be ineffectual to energize the motors when the sun's rays are substantially parallel with the tube.

14. In combination in a navigation instrument, a support, finder means mounted on a substantially horizontal pivot on the support, motor means for the finder, motor means for automatically adjusting the support in azimuth until the axis of the finder means lies parallel with the plane determined by the east, the sun and the west, the finder means controlled by the sun's radiant energy and automatically positionable on its axis by its motor means to point at the sun, and motor driven means automatically responsive to such positioning to indicate the angular movement of the finder on its axis.

15. In combination, means positionable to represent a starting point, means positionable to represent an objective, means responsive to both such positionings to indicate a course from one to the other, and a device responsive to the sun's radiation to change the positioning of the first mentioned means to accord with a change of position, and the responsive means continuously actuated to indicate a course from the new position to the objective.

16. In combination, a horizontally pivoted support, a finder tube pivotally mounted on the support, means responsive to the sun's radiation to move the tube on its support to follow and point at the sun, a compass, means operatively associated with the compass for rotating said support so that pivotal axis of the support lies in a predetermined geographical line.

17. In combination, means positionable to represent a line from a position to the center of the earth, means positionable to represent a line from an objective point to the center of the earth, means controlled by the sun's rays for changing the position of the first means relative to the second to indicate the true geographical position, and means constantly effective to indicate the azimuth of the line between the position and objective as the position changes.

18. In combination, finder means having a part initially disposed in a plane determined by the east-west and zenith, and having a part adjustable on an axis lying in said plane to form an angle with said plane determined by said plane and a plane formed of the east-west and sun, means positionable to indicate the angle formed thereby as a function of latitude of position, and said finder means having a part movable on an axis perpendicular to said first mentioned axis and arranged to point at the sun, means movable in one direction in response to the pointing of said part of the finder means at the sun, said means being movable in a direction cancelling the responsive movement, and means adjustable in response to the differential between the responsive movements to indicate the substantial longitude of the position, time controlled latitude correcting means to change the indication of latitude by simple harmonic motion, the last mentioned means so arranged as substantially to correct for the error in said indication caused by the declination of the sun, time controlled longitude correcting means to change the indication of longitude by simple harmonic motion, and said longitude correcting means so arranged as substantially to correct for the error in said indication caused by the equation of time.

19. In a navigating instrument, a dial positionable relative to a fixed point to represent a course relative to a north and south meridian that a destination lies from a position, means including an element responsive to the radiant energy of a celestial body and pointing at same for automatically changing the indication of the dial as the instant position and the angularity of the course change, a pointer movable relative said fixed point, means operatively associated with the pointer to angularly move the pointer in response to deviations from the course, means operatively associating the pointer with the first mentioned means so that the motion of the said pointer is a resultant of the actuation of both said means, the degree of angular deviation of the pointer from the fixed point representing the angular change through which the craft containing the instrument must be turned to be on the course.

20. In a navigating instrument, a dial positionable relative to a fixed point to represent a course relative to a north and south meridian that a destination lies from a position, means for automatically changing the indication of the dial as the instant position and the angularity of the course change, a pointer movable relatively to said fixed point, means operatively associated with the pointer to angularly move the pointer in response to deviations from the course, said pointer operatively associated with the first mentioned means so that the motion of the said pointer is a resultant of the actuation of both said means, the degree of angular deviation of the pointer from the fixed point representing the angular change through which the craft containing the instrument must be turned to be on the course, and supplemental means operatively associated with the pointer and dial to impress on the resultant a correction for the deviation of a magnetic compass from geographic north, which gives a complete resultant of the two first mentioned and the last mentioned means.

21. In combination, means having and rotatable about an axis and positionable about a universal center in a vertical plane passing through said axis, and in accordance with the latitude of position, a secondary means having and rotatable about an axis positionable in a vertical plane about the universal center in accordance with the latitude of the objective, means representing the difference in longitude between the position of the objective for positioning the secondary means automatically about the universal center in a horizontal plane, resilient urging means operatively engaging the first two mentioned means to impose torque thereon, and means responsive to the relative rotated positions of both said means and to the resilient means for indicating a course from the position to the objective.

22. In combination, means automatically pointing at the sun, means operatively associated therewith and variably positionable in accordance with the movement of the first mentioned means, means positionable in accordance with an objective, means automatically responsive to both said positionings for indicating a course between them, and automatically variable as the position varies, and an instrument board, instruments on the board operatively associated with all of said above mentioned means to indicate the course and deviations from the course.

23. In combination, means positionable to represent a starting point, an electric motor for positioning said means by increments to represent changes of position, means positionable to represent an objective, an electric motor for positioning said last mentioned means, resilient means operatively associated with both said first mentioned means, electric motor means operatively associated with the resilient means and continuously responsive to both such positionings to continuously indicate a course from one point to another at all instants after the instant of starting to traverse a course.

24. In combination, a device automatically and constantly pointing at a celestial source of radiant energy, a time controlled mechanism, radiant energy responsive means operatively associated with the device and operative to couple the time controlled mechanism with the device in driving relation when the radiant energy is not incident upon the device.

25. In combination, a device arranged for rotation about an axis, time controlled mechanism for driving the device about the axis, radiant energy responsive means operable when celestial radiant energy is incident on the device and controlled by said energy to uncouple the driving relation of the time controlled mechanism and said device, and means responsive to celestial radiant energy to cause said device to turn on its axis thereafter and point at the source of radiant energy.

26. In combination, a finder element, rotatable on an axis through a full rotation, a time controlled mechanism, means automatically responsive to a source of celestial radiant energy operative to point the finder element at and to follow said source of celestial radiant energy, means automatically operative to disengage the automatic means and the finder and simultaneously to couple the time controlled mechanism and the finder, means automatically operated in synchronism with the automatic means operating the finder responsive to movement of the finder element to assume a position representative of the instant position of the craft.

27. In a navigating instrument, means movable to point at a celestial body, means for automatically moving the first mentioned means to point at such body in response to radiant energy from such body, time controlled mechanism arranged for engagement in driving relation to said first mentioned means when the automatic means is inoperative.

28. In a navigating instrument, means movable to point at a celestial body, means for automatically moving the first mentioned means to point at such body in response to radiant energy from such body, and automatic means responsive to the radiation from said body for selective alternately coupling said moving and driving means with the first mentioned means.

29. In combination, means positionable to represent the instant position of a craft, a finder element, means automatically moving the finder to point at a celestial body, means coupling the automatic means and the positionable means to maintain the positionable means to represent the instant position as it changes, time controlled mechanism, means for simultaneously uncoupling the automatic means from the finder unit, and from the positionable means, and for coupling the finder means with the time controlled means, said means operable to disconnect the time controlled mechanism from the finder element, and simultaneously to couple the automatic means and the finder and the positionable means at the conclusion of a time controlled driving interval.

30. In combination, means positionable to represent a starting point and variable to represent a new position, means responsive to and controlled by the radiant energy of a celestial body for varying the position of said means, means positionable to represent an objective, means operatively associated with the first and third mentioned means to indicate the angular distance between the points, and follow-up means automatically responsive to the variation of the first means to change the indication of said last mentioned means.

31. In combination, electrically actuated means positionable to represent a starting point and adjustable by increments to represent changes in position, electrically actuated means positionable to represent an objective, electrically actuated follow-up means automatically continuously responsive to both such positionings to continuously indicate a course from one point to the other.

32. In combination, means positionable to represent a starting point and variable to represent a new position, a motor for positioning said means, means positionable to represent an objective point, a motor for positioning said last mentioned means, means responsive to both settings for indicating a course from one point to the other, motor means operatively associated with said last mentioned means, follow-up means operatively associated with said motor means to automatically change the indication as the first position varies.

33. In combination, a pendular suspension, means pivotally mounted thereon and automatically actuated to point at a heavenly body and to assume an angle relative to the vertical, means responsive to pivotal movement of said means to indicate said angle, means for modifying the indication as the pivoted means moves on its pivot incident to swinging of the suspension in one direction, and means for cancelling the modification as the suspension swings in the other direction to maintain a mean angular indication.

34. In combination, a position means having an axis and positionable with its axis representing a line from an instant point of position to the center of the earth, an objective means having an axis representing a line from an objective point to the center of the earth, means operatively associating both said means for relative angular adjustment about a universal center common to all said means, means operatively associated with the third mentioned means forming bearing supports for each of said position and objective means for rotation about said respective axes, tension means engaging each means and urging each to rotation about its respective axis when the axes are non-coincident and diverge from a fixed plane of reference containing one axis and an axis representing that of the earth, means for indicating the degree of rotation of the position means from the fixed plane as a course to the objective.

35. In combination, a pair of electrically actuated individually rotatable elements each respectively having axes and perpendicular extensions, means operatively associating the elements with their axes intersecting in a universal center and with the elements arranged for relative angular adjustment, electric motor means for positioning each element to establish a relative angular relation, resilient means engaging the respective extensions and responsive to the relative angular adjustment of the elements out of a fixed common plane arranged to impose torque upon the elements, follow-up circuit controllers actuated in response to said torque and controlling circuits through the electrically actuated elements, said elements arranged to rotate in response to such controlled circuits until the axes and extensions lie in a secondary common plane angularly divergent from the first mentioned common plane.

36. In combination, means including a rotatable element positionable to represent a starting point and variable to represent a new position, means including a rotatable element positionable to represent an objective, resilient urging means operatively associated with the rotatable elements of both said first mentioned means and arranged to impose torque thereon, means responsive to the torques to move said first two means to indicate the angular distance between the points and automatically responsive to the variation of positionable means and to the resulting change in torque to indicate the compass course between the new position and the objective.

37. In combination, means having an axis of rotation and positionable to represent a starting point, means having an axis of rotation and positionable to represent an objective, resilient urging means operatively associated with both said first mentioned means and arranged to impose torque on both said means tending to turn them about their respective axes, means responsive to both such torques to move said first two means to cause the resilient means to indicate a course from one point to the other, means for changing the position of one of said first mentioned means, said resilient means arranged to vary automatically the imposed torque in response to such change of position, said responsive means arranged to accord automatically and synchronously with such change of position to continuously indicate a course from one point to the other.

38. In combination, finder means having a part initially disposed in a plane determined by the east, west and zenith, said finder means having a part adjustable on an axis lying in said plane to form an angle with said plane determined by said plane and a plane formed of the east, west and sun, motor means for adjusting said last mentioned part, means positionable to indicate the angle formed thereby as a function of latitude of position, motor means for positioning the last mentioned means, and said finder means having a part movable on an axis perpendicular to said first mentioned axis and responsive to the radiant energy of the sun and arranged to point continuously at the sun during daylight, motor means movable in one direction in response to the pointing of said part of the finder means at the sun, time controlled means for periodically energizing said last mentioned movable means in a direction opposite to the responsive movement to effect a resultant indication of the longitude of the position.

39. In combination, a movable device, an element controlled by the radiation of and automatically pointing at the sun, a time controlled mechanism, means coupled with the element for moving the device in one direction in response to the relative movement of the sun and the earth as determined by the element, and means for moving said device in another direction in response to the time controlled mechanism, the sum of both movements being equal when the device is stationary relative to the earth, and the device being moved as a resultant of the differential movements to indicate a change of longitude when the device is moved relative to the earth.

40. In a navigating instrument in combination, a rotatable device, a time controlled mechanism for rotating the device in one direction, an element controlled by the radiation of and automatically pointing at a heavenly body, means operatively coupled with the element for moving the device selectively in either direction in response to movement of said element, said rotatable device being responsive to the differential between the time controlled and element controlled movements to indicate a change of longitude of position.

41. In combination in a navigating instrument, a support, a finder tube universally adjustable relative to the support, actuatable devices controlled by the radiation of the sun and automatically operated for moving the tube in two planes to point the tube at the sun, said actuatable devices being at rest during any interval in which the tube points at the sun.

42. In combination, a navigating instrument comprising a tube, means for supporting the tube for adjustment in two mutually normal perpendicular planes, reversible electric means for moving the tube in each plane, photo-electric devices in the tube disposed substantially radially of its longitudinal axis and arranged in diametrically spaced pairs, each pair being in circuits with the respective reversible means, means for reflecting rays of the sun incident on the end of the tube into the tube so as to energize at least one, but never more than two simultaneously, photo-electric devices when the sun's rays are angularly divergent from the longitudinal axis of the tube, to complete such circuit through the appropriate electric means as will move the tube to a position such that the sun's rays are parallel with the longitudinal axis of the tube, and means arranged to preclude energization of any photo-electric device when the sun's rays are parallel with the longitudinal axis of said tube, and means operatively coupled in driven relation with the tube to indicate a position.

43. In combination, a navigating instrument comprising means constantly responsive to the sun's radiant energy, means controlled by said radiant energy to move said first means to point the same at the sun, and means compensating for the refraction of the sun's rays to keep the first mentioned means pointing at the sun in its true position, regardless of the apparent position incident to refraction, and means operatively coupled with the first mentioned means to indicate the instant position.

44. In a navigating instrument, means automatically controlled by the radiant energy of and movable to point at a celestial body, and means operatively coupled therewith to indicate position.

45. In combination, a navigating instrument comprising a tube having a restricted opening, a plurality of photo-electric cells in the tube diametrically spaced from the longitudinal axis of the tube at least as far apart as the width of the restricted opening, and actuatable devices in the circuits of the photo-electric cells for positionally controlling the tube, and means operatively coupled in driven relation with the tube to indicate a position.

46. In combination, a navigating instrument comprising a tube having a restricted opening, a reflector in the tube in registry with the restricted opening, a plurality of photo-electric cells disposed in the tube out of registry with the opening and with the reflector, an inner reflecting surface surrounding the opening, and arranged to reflect light rays primarily reflected from the reflector upon a given photo-electric cell simultaneously with the impingement of directly incident light on said cell incident to the entrance of light rays into the tube which are angularly divergent from the longitudinal axis of the tube, and means operatively coupled in driven relation with the tube to indicate a position.

47. A navigating instrument comprising a tube having a restricted opening, a reflector in the tube in registry with the opening, a plurality of photo-electric cells disposed in the tube out of registry with the reflector and said opening, inner reflecting surfaces in the tube so arranged as to reflect light rays upon a given photo-electric cell when the tube is at such an angular relation to incident light that light rays passing through the opening would not be directly incident upon the reflector or upon a photo-electric cell, and means operatively coupled in driven relation with the tube to indicate a position.

48. In combination, a navigating instrument comprising pointing means, means automatically responsive to radiant energy from a celestial source to point the first mentioned means at said source of radiant energy, and means operatively coupled with the pointing means to indicate position.

49. In combination, means controlled by the sun's radiant energy automatically operative to point at the sun, independent means responsive to setting for the latitude and longitude of the starting position, means operative subsequent to said setting operatively associating said first mentioned means with the second mentioned means in synchronized driving relation to obviate corrections for declination and the equation of time.

50. In combination in a navigation instrument, finder means having a part initially and continuously disposed in a plane determined by the east, west and zenith, motor means to maintain said part in said plane, another part of the said means automatically adjustable on an axis lying in said plane and responsive to the sun's radiant energy to form an angle with the said plane determined by the said plane and a plane formed of the east, west and the sun, motor means controlled by radiant energy incident on said second part for adjusting the same, and motor driven means automatically positionable in accordance with said angle to indicate the latitude.

51. In combination, a support, a frame pivotally mounted in the support, means moving the support about a substantially vertical axis so that its longitudinal horizontal axies lies in a predetermined vertical plane, motor means for securing such movement, a tube pivotally mounted on the frame on an axis transverse of the longitudinal axis of the frame, motor means for swinging the frame upon its axis to swing the tube to lie in a plane traversed by the sun, a time mechanism, motor means for moving the tube on its transverse axis with a step-by-step movement to point at the sun, motor means synchronized with the last mentioned means and movable in one direction therewith, said last mentioned means also synchronized with the said time mechanism which moves in the opposite direction with a step-by-step movement, and means responsive to the differential between the two step-by-step movements to indicate a change in position.

52. In combination, means positionable to represent a starting point and responsive to the radiant energy of a celestial body to continuously indicate position, means positionable to represent an objective, torque creating urging means operatively associated with both said means and responsive to the position of the objective means and to any change of position to develop torque on both said first mentioned means, means responsive to both such torques to indicate a course from one to the other.

53. In combination, a rotatable element having an axis, a second rotatable element having an axis, means joining the two elements for relative universal adjustment with their axes intersecting, means associated operatively with the rotatable elements to establish a spherical triangle of which two components are the said respective axes resilient means operatively associated with each element for automatically rotating each element and resolving the spherical triangle.

54. In an instrument, time controlled means for producing simple harmonic motion, means positionable in accordance with the latitude of an instant position as determined by the relative position of the sun with said time controlled means having simple harmonic motion based upon a time cycle of substantially one year operably associated with the positionable means to substantially compensate for the declination of the sun, means indicating the latitude of position as a resultant of the movement of both means.

55. In an instrument, means positionable in accordance with the longitude of an instant position as determined by the relative position of the sun, time controlled means, means having simple harmonic motion operably associated with the time controlled means and having a time cycle of substantially one year and both operably associated with the first mentioned means to substantially compensate for the equation of time.

56. In combination, means positionable to represent a starting point and variable to represent a new position, means responsive to and controlled by the radiant energy of a celestial body for varying the position of said means, means positionable to represent an objective point, means for indicating the great circle course from the position point to the objective, and follow-up means operatively associated with the last mentioned means and the first mentioned means to synchronously change the course indication as the first point varies with respect to the second.

57. A navigating instrument comprising means constantly maintained in predetermined relation to a plane defined by the east, west and zenith, means including an element responsive to and automatically pointing at a radiant heavenly body and lying constantly in predetermined relation to the east, west and said radiant heavenly body, means operatively associating the first two means, and means for constantly and automatically indicating the angular relation between the planes determined by the first two means as a function of latitude of position.

58. In an instrument, means positionable in accordance with the value of an angle between intersecting planes respectively defined by the east, west and sun and by the east, west and zenith, means for producing simple harmonic motion time controlled means positionable in accordance with the value of the angle of declination by said means for producing simple harmonic motion and having a cycle of substantially one year, means operatively associating the first and last mentioned means, and means responsive to both said mentioned means to indicate the latitude.

59. In combination, a position representing means having an axis and positionable with its axis representing a line from an instant point of position to the center of the earth, an objective means having an axis representing a line from an objective point to the center of the earth, means operatively associating both said means for relative angular adjustment about a universal center common to all said means, means operatively associated with the third mentioned means forming bearing supports for each of said position and objective means for rotation about said respective axes, tension means engaging each means and urging each to rotation about its respective axis when the axes are non-coincident and diverge from a fixed plane of reference containing one axis and an axis representing that of the earth, means for indicating the degree of rotation of the position representing means from the fixed plane as a course of the objective.

60. In combination, a pair of individually rotatable elements each respectively having axes and extensions substantially perpendicular to the respective axes, means operatively associating the elements with their axes intersecting in a universal center and with the elements arranged for relative angular adjustment, follow-up means engaging the respective extensions and responsive to relative angular adjustment of the elements out of a fixed common plane arranged to impose torque upon the elements, said elements arranged to rotate in response to such torque until the axes and extensions lie in a secondary common plane angularly divergent from the first mentioned common plane with the universal center common to both planes.

61. In combination, a device having an axis and variably positionable in accordance with the instant positioning of a craft with its said axis representing a line from the instant position on the earth to the center of the earth, a device having an axis and positionable in accordance with an objective on the earth with its said axis representing a line from the objective point on the earth to the center of the earth, means coupling the two devices for relative angular adjustment about a common universal center, follow-up means defining a plane of reference in which the axis of one of said devices lies, means operatively associated with both said devices and directly, automatically and continuously responsive to the relative angular positioning of the axes of said devices as a function of the adjustment of said second mentioned device relative to said plane of reference and also relative to a second plane perpendicular to the reference plane to indicate a course from the position to the objective.

62. In combination, a pair of electrically actuated individually rotatable elements each respectively having axes and perpendicular extensions, means operatively associating the elements with their axes intersecting in a universal center and with the elements arranged for relative angular adjustment, electric motor means for positioning each element to establish a relative angular relation, follow-up means comprising resilient means engaging the respective extensions and responsive to the relative angular adjustment of the elements out of a fixed common plane arranged to impose torque upon the elements, circuit controllers actuated in response to said torque and controlling circuits through the electrically actuated elements, said elements arranged to rotate in response to such controlled circuits until the axes and extensions lie in a secondary common plane angularly divergent from the first mentioned common plane.

63. In combination, means positionable to represent a starting point, an electric motor for positioning said means by increments to represent changes of position, means positionable to represent an objective, an electric motor for positioning said last mentioned means, resilient means operatively associated with both said first mentioned means, electric motor means operatively associated with the resilient means and continuously responsive to both such positionings to continuously indicate a course from one point to another at all instants after the instant of starting to traverse a course.

64. In combination, finder means having a part initially disposed in a plane determined by the east, west and zenith, another part of the said means disposed in a plane containing the east, west and sun and adjustable on an axis lying in said first mentioned plane to form an angle with the said first mentioned plane as a function of latitude, indicating means adjustable in part in response to the angle between the two said planes, time controlled correcting means possessed of simple harmonic motion, means operatively associating the correcting means with another part of said indicating means whereby said last mentioned part of said means is caused to be adjusted in response to a complemental function of latitude, the cycle of simple harmonic motion being completed in approximately one year and being so disposed relative to the cycle of declination of the sun as to directly compensate therefor, the said respective parts of said indicating means being operatively coupled to effect a resultant reading of latitude substantially free from errors caused by the declination of the sun.

65. In combination, a navigating instrument comprising a tube, means for supporting the tube for adjustment about a universal center, means for positioning the tube to point at the sun, a translucent hemispherical dome arranged to enclose the tube and having its center out of registry with the universal center of the tube and so arranged as to compensate for the refraction of the sun's rays, and means operatively coupled in driven relation with the tube to indicate a position.

66. In combination, a navigating instrument comprising means constantly responsive to the sun's movement to point at the sun, and means compensating for the refraction of the sun's rays to keep the first mentioned means pointing at the sun in its true position, regardless of the apparent position incident to refraction, and means operatively coupled with the first mentioned means to indicate the instant position.

67. In combination in a navigating instrument, means pivotally supported on an axis normally lying in a predetermined geographical line to point at a radiant celestial body, and means responsive to the radiant energy of such celestial body for maintaining said axis on said predetermined line.

68. A navigating instrument having an axis disposed in a north-south direction, finder means arranged to point at the sun, means for supporting the finder means on an axis perpendicular to the north-south axis so as to point the finder means at the sun, and means for adjusting said finder means on an axis perpendicular to the north-south axis to accord with the declination of the sun.

69. A navigating instrument comprising finder means arranged to point continuously at the sun during the daylight hours, means supporting the finder means on an east-west axis, means supporting the finder means on a north-south axis, and means supporting the finder means on a supplemental axis perpendicular to said north-south axis.

70. A navigating instrument comprising finder means, means adjusting the finder on an east-west axis to point at the sun, means adjusting the finder on a north-south axis to point at the sun, means engaging the finder whereby it may be adjusted relative to an axis perpendicular to the north-south axis to accord with the declination of the sun.

71. A navigating instrument having an axis disposed in a north-south line comprising a supporting assembly and a finder element, time controlled mechanism for adjusting the finder element relative to an axis substantially perpendicular to the north-south line by simple harmonic motion coordinated with the cycle of declination of the sun so as to correct therefore, means in the supporting assembly for supporting the finder element for adjustment on an east-west axis in accordance with latitude, and means in the supporting assembly for supporting the finder tube for adjustment on a north-south axis in accordance with longitude.

72. A navigating instrument having an axis disposed in a north-south line comprising a finder element, means defining and supporting the element on two axes respectively perpendicular to the north-south line.

73. A navigating instrument having an axis disposed in a north-south line comprising finder means responsive to the sun's radiant energy for automatically pointing said finder independent at the sun, and means for adjusting said finder means on an axis perpendicular to the north-south line to compensate for the declination of the sun.

74. A navigating instrument having an axis disposed in a north-south line comprising finder means responsive to the sun's radiant energy for automatically pointing said finder at the sun, and means for adjusting said finder means on an axis perpendicular to a north-south axis to compensate for the declination of the sun, and supplemental means automatically controlled by the sun's radiant energy for maintaining said axis in the north-south line.

75. A navigating instrument comprising finder means, means supporting the finder means on an axis lying in a predetermined geographical line, said finder including photo-electric circuits responsive to the radiant energy of a celestial body, means controlled by said circuits for moving the finder means on said axis to point at the celestial body, said last mentioned means also operative to orient the finder means to maintain the said axis on said predetermined line.

76. In a navigating instrument, means establishing solar radiation responsive photo-electric circuits, a finder means, motor means operatively associated with both of said means for turning the finder element on an axis lying in a predetermined geographical line to point at the source of solar radiation, motor means operatively associated with the two first mentioned means for orienting the finder element to dispose the said axis in said predetermined geographical line, and means controlling each of said operative associations so as to selectively energize the proper motor.

77. A navigating instrument for disposition in a craft, comprising means arranged to continuously assume a predetermined angular relation to the sun's rays as a function of position during a given period of running, means operatively associated therewith to continuously indicate the position of the craft, means operatively coupling the said first and second mentioned means said last mentioned means arranged to respond pursuant to a deviation of the said first means from the predetermined relation incident to pitching and rolling motion of the craft carrying the instrument as a merely instantaneous error only, said last means arranged to cancel said deviation response pursuant to a cancelling pitching and rolling motion of the craft and arranged whereby past errors incident to responses to past pitching and rolling motions have no cumulative effect upon the instantaneous indication of position.

78. A navigating instrument comprising means for determining a course, and means operatively associated therewith in synchronous coupled relation and responsive to instant geographical positioning of the instrument and arranged to nullify any instantaneous errors incident to any movement of the craft carrying the instrument, whether the movement is relative to the instrument or relative to any previous craft position, so that the course determination is free from all accumulated errors.

79. In an instrument, means arranged for indicating the instant position of a craft, means positionable in accordance with the position of the craft, means operatively coupling the second mentioned and indicating means to subsequently move the indicating means as a result of the movement of the second mentioned means.

80. In an instrument, indicating means positionable to indicate the position of a craft, finder means positionable in accordance with the craft's position, motor means for causing the finder means to point at the sun, a follow-up mechanism coupling the finder and indicating means to actuate the indicating means with a time delay.

81. In an instrument, indicating means positionable to indicate the position of a craft, finder means positionable in accordance with the craft's position, motor means for causing the finder means to point at the sun, a follow-up mechanism coupling the finder and indicating means to actuate the indicating means with a time delay, said follow-up being inoperative to reposition said indicating means responsive to motions of the finder means for time intervals less than those predetermined in a motion-time factor of the follow-up mechanism.

82. In an instrument, means responsive to changes of a craft's geographical position, finder means responsive to the relative position of the sun, means operatively coupling the finder means and responsive means for actuating the responsive means to indicate change of position, said means incorporating a time delay which permits the responsive means to be substantially inoperative to transitory oscillations of the finder means.

83. A navigating instrument comprising finder means suspended for universal movement about a point and responsive to the sun's relative position, a periodically operative follow-up system indicating means operated by the finder means through said follow-up system which is operable periodically, thus making the responsiveness of the indicating means substantially inoperative to transitory oscillations of the finder means.

84. A navigating instrument comprising a finder which assumes a mean position indicative of the geographical position of the craft at any instant, said finder being susceptible to oscillation due to pitching and rolling movements of the craft, means tending to reposition the finder pursuant to each oscillation, and means to nullify any errors accrued as the result of said oscillation.

85. In an instrument, position responsive means, finder means, means operatively asynchronously coupling the finder means and responsive means for actuating the responsive means to indicate position, said means being automatically substantially inoperative to transmit transitory fluctuations of the finder means incident to pitching and rolling movements of the craft carrying the instrument.

86. In an instrument, a device for pointing at a celestial radiant body, and radiation responsive means co-acting therewith to indicate that the device is pointing at the celestial radiant body.

87. In an instrument, a device for pointing at a celestial radiant body, radiation responsive means co-acting therewith to indicate that the device is pointing at the celestial radiant body and means operable when the device points at such celestial radiant body and co-acting with said device to indicate the geographical position of the instrument.

88. In an instrument, means movable to point at a celestial radiant body, celestial radiation responsive means operatively associated with the first means, means operatively associated with the radiation responsive means for moving the first mentioned means to point at such body in automatic response to appropriate actuation of the radiation responsive means.

89. In an instrument, a device movable to point at a celestial radiant body, motor means operably associated with said device to point it at such body, electric radiation responsive means operably associated with said motor means and with said device to actuate the motor means to point said device at such body in response to appropriate stimulation of said radiation responsive means by energy from such celestial body.

90. In combination, means positionable to represent a starting point and variable to represent a new position, means positionable to represent an objective point, means for indicating the great circle course from the position point to the objective, and follow-up means operatively associated with the last mentioned means and the first mentioned means to synchronously change the course indication as the first point varies with respect to the second.

91. In an instrument, time controlled means for producing simple harmonic motion, means positionable in accordance with the apparent latitude of an instant position, said time controlled means having simple harmonic motion based upon a time cycle of substantially one year and being operably associated with the positionable means to substantially compensate for the declination of the sun, means indicating the latitude of position as a resultant of the movement of both means.

92. In an instrument, means positionable in accordance with the apparent longitude of an instant position, time controlled means, means having simple harmonic motion operably associated with the time controlled means and having a time cycle of substantially one year and both operably associated with the first mentioned means to substantially compensate for the equation of time, and means indicating the longitude of position as a resultant of the movement of all the first mentioned means.

93. In an instrument, a device movable to point at a celestial radiant body, indicating means arranged for setting in accordance with a predetermined function of the geographical position of the instrument and means actuated by the radiant energy of such celestial body operatively associated and coacting with said device and with said indicating means to effect a setting of said indicating means when the device points at such celestial radiant body to indicate a predetermined function of the geographical position of the instrument.

JOSEPH C. CLARK.